United States Patent
Baek et al.

(10) Patent No.: US 9,840,197 B2
(45) Date of Patent: Dec. 12, 2017

(54) APPARATUS FOR PROVIDING AROUND VIEW AND VEHICLE INCLUDING THE SAME

(71) Applicant: LG ELECTRONICS INC., Seoul (KR)

(72) Inventors: Iljoo Baek, Seoul (KR); Sungmin Kim, Seoul (KR); Younsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 315 days.

(21) Appl. No.: 14/671,717

(22) Filed: Mar. 27, 2015

(65) Prior Publication Data

US 2015/0353011 A1 Dec. 10, 2015

(30) Foreign Application Priority Data

Jun. 10, 2014 (KR) ........................ 10-2014-0070320

(51) Int. Cl.
*H04N 7/18* (2006.01)
*B60R 1/00* (2006.01)
*G06T 3/40* (2006.01)

(52) U.S. Cl.
CPC .............. *B60R 1/00* (2013.01); *G06T 3/4038* (2013.01); *H04N 7/181* (2013.01); *H04N 7/188* (2013.01); *B60R 2300/303* (2013.01); *B60R 2300/304* (2013.01)

(58) Field of Classification Search
None
See application file for complete search history.

(56) References Cited

U.S. PATENT DOCUMENTS

| 6,925,403 | B2 | 8/2005 | Nowak |
| 7,337,650 | B1 | 3/2008 | Preston et al. |
| 2011/0025848 | A1* | 2/2011 | Yumiba ............... B60R 1/00 348/148 |

(Continued)

FOREIGN PATENT DOCUMENTS

| CN | 10-3609101 | 2/2014 |
| DE | 10 2008 046545 | 5/2009 |

(Continued)

OTHER PUBLICATIONS

European Search Report dated Nov. 17, 2015 issued in Application No. 15171361.7.

(Continued)

*Primary Examiner* — Eileen Adams
(74) *Attorney, Agent, or Firm* — Ked & Associates, LLP

(57) ABSTRACT

An around view provision apparatus and a vehicle including the same are disclosed. The around view provision apparatus may include a plurality of cameras provided to capture images of different regions around the vehicle. A memory may be provided to store a reference image for each of the cameras. A processor may calculate offset information for at least one of the plurality of cameras based on a difference between the reference image for the camera stored in the memory and an image captured by the camera. Respective images captured through the plurality of cameras may be combined using the offset information so as to generate an around view image.

18 Claims, 22 Drawing Sheets

(56) References Cited

U.S. PATENT DOCUMENTS

| | | |
|---|---|---|
| 2011/0285856 A1 | 11/2011 | Chung |
| 2012/0027258 A1* | 2/2012 | Uchida .............. G06K 9/00805 382/103 |
| 2012/0154586 A1 | 6/2012 | Chung et al. |
| 2015/0332446 A1* | 11/2015 | Wang ................. H04N 13/0246 348/37 |

FOREIGN PATENT DOCUMENTS

| | | |
|---|---|---|
| JP | 2009-060556 A | 3/2009 |
| JP | 2013-20308 A | 1/2013 |
| JP | 2014-048803 | 3/2014 |
| KR | 10-2010-0052717 A | 5/2010 |
| KR | 10-1113679 B1 | 2/2012 |
| KR | 10-2014-0033803 A | 3/2014 |
| KR | 10-2014-0048539 A | 4/2014 |
| WO | WO 2013/130082 | 9/2013 |

OTHER PUBLICATIONS

B. Schneidermann: "Touch Screens Now Offer Compelling Uses"; IEEE Software; vol. 8, No. 2; Mar. 1, 1991; pp. 93-107; XP55303655.

Anonymous: "2.39 Calibration", In: "International vocabulary of metrology—Basic and general concepts and associated terms (VIM)"; Jan. 1, 2012; JCGM—Joint Committee for Guides in Metrology; pp. 28-28; XP55303639.

European Office Action dated Sep. 27, 2016 issued in Application No. 15001598.0.

Korean Office Action issued in Application No. 10-2014-0070320 dated Jun. 26, 2015.

Chinese Office Action dated May 26, 2017 issued in Application No. 201510249569.6 (English translation attached).

* cited by examiner (a)  (b)

(a)        (b)

(a)                                    (b)

(a)  (b)

APPARATUS FOR PROVIDING AROUND VIEW AND VEHICLE INCLUDING THE SAME

CROSS-REFERENCE TO RELATED APPLICATION

This application claims priority to Korean Patent Application No. 10-2014-0070320, filed on Jun. 10, 2014, whose entire disclosure is hereby incorporated by reference.

BACKGROUND

1. Field

The present disclosure relates to an around view provision apparatus and a vehicle including the same and, more particularly, to an around view provision apparatus that is capable of providing an accurate around view image based on a calibrated image and a vehicle including the same.

2. Background

Around view provision apparatuses and vehicles including the same are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Exemplary embodiments of the present disclosure will be described with reference to the attached drawings.

The terms "module" and "unit," when attached to the names of components are used herein to help the understanding of the components and thus they should not be considered as having specific meanings or roles. Accordingly, the terms "module" and "unit" may be used interchangeably.

Broadly, a vehicle is a device that allows a driver to move in a desired direction. A representative example of the vehicle may be a car. In order to improve convenience of a user who uses the vehicle, the vehicle may be equipped with various sensors and electronic devices. In particular, various devices to improve driving convenience of the user have been developed. For example, a rear view camera may be provided to display a rear view image when moving the vehicle backward or when parking the vehicle.

A vehicle as described in this specification may include a car, a motorcycle, or another appropriate type of vehicle. Hereinafter, a description will be given based on a car merely for sake of convenience. It should be appreciated, however, that a vehicle as described in this disclosure may include various types of transportation devices, including but not limited to, a vehicle having an engine as a power source, a hybrid vehicle having an engine and an electric motor as a power source, an electric vehicle having an electric motor as a power source, or the like.

Meanwhile, an around view provision apparatus as described in this specification may be an apparatus that includes a plurality of cameras and which may combine a plurality of images captured by the cameras to generate an around view image. In particular, the around view provision apparatus may be a vehicle-based apparatus that provides a top view or a bird's eye view. It is an object of the present disclosure to provide an around view provision apparatus that is capable of providing an accurate around view image based on a calibrated image and a vehicle including the same. Hereinafter, a description will be given of various embodiments of an around view provision apparatus according to the present disclosure and a vehicle including the same.

Figure 1:
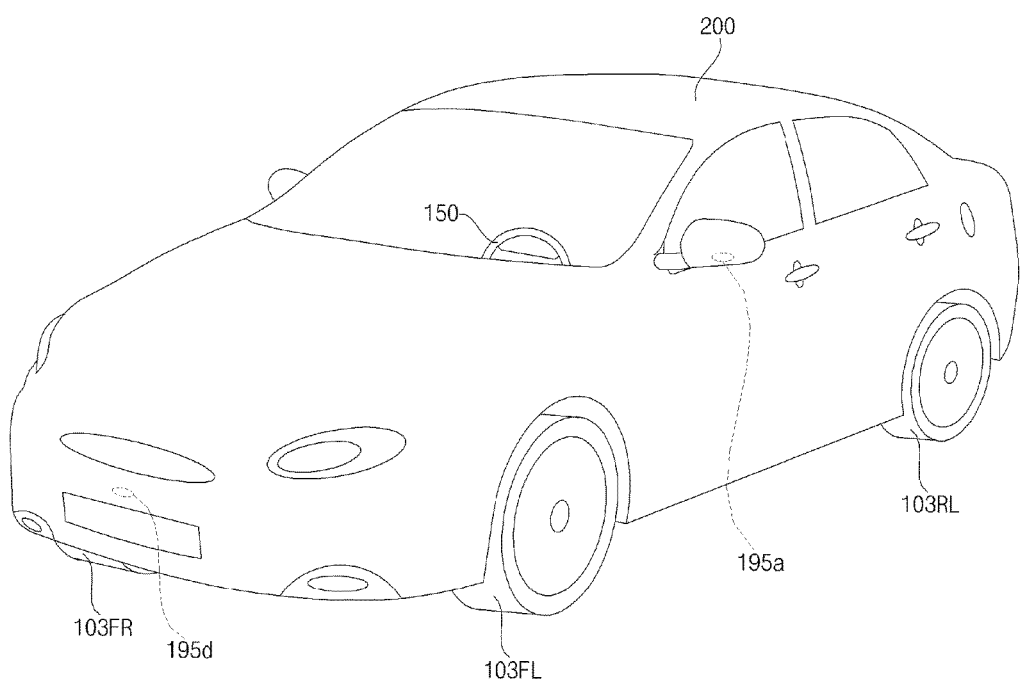
FIG. 1 is a view showing the external appearance of a vehicle having around view cameras according to an embodiment of the present disclosure.

FIG. 1 is a view showing the external appearance of a vehicle having around view cameras according to an embodiment of the present disclosure. A vehicle 200 may include a wheels 103FR, 103FL, 103RL, etc., a steering wheel 150, and a plurality of around view cameras 195a, 195b, 195c, and 195d mounted on the vehicle 200. In FIG. 1, only a left side view camera 195a and a front view camera 195d are shown merely for the sake of convenience.

When the vehicle moves forward at a predetermined speed or less or when the vehicle moves backward, the around view cameras 195a, 195b, 195c, and 195d may be activated to acquire images. The images acquired by the cameras may be signal-processed by an around view provision apparatus 100 (see FIG. 3A or 3B). Moreover, the cameras may capture various types of images such as record video images or photograph still images, and the around view provision apparatus as disclosed in various embodiments herein may be applied to these types of images.

Figure 2A:
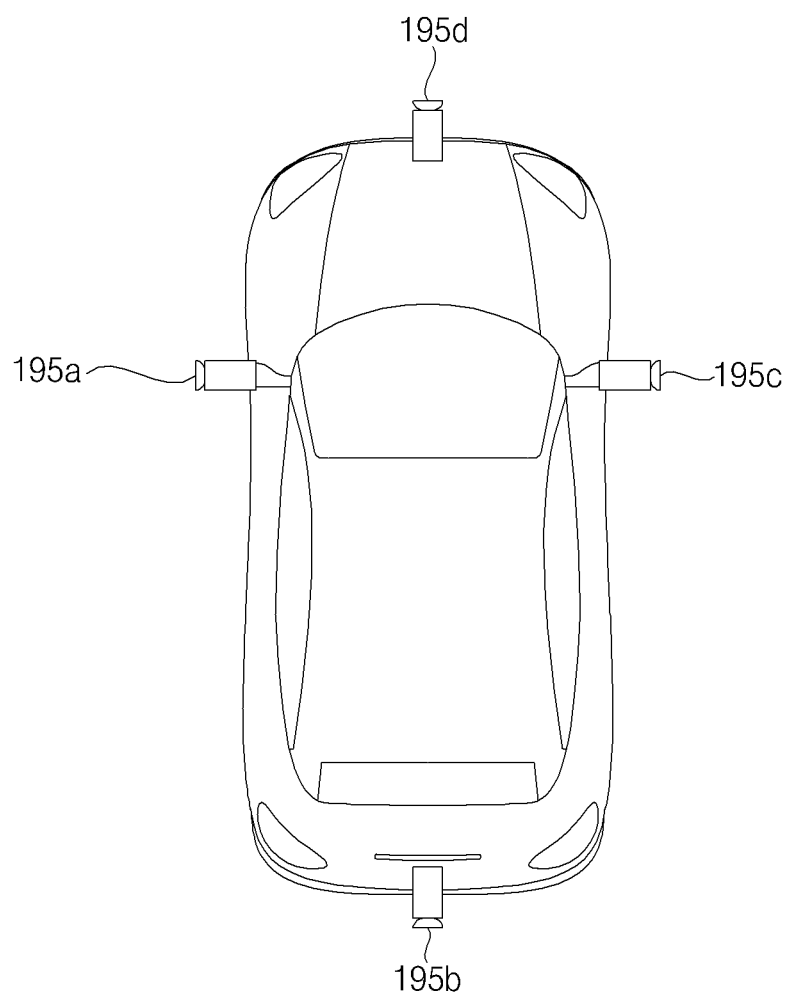
FIG. 2A is a view schematically showing positions of the around view cameras attached to the vehicle shown in FIG. 1.
Figure 2B:
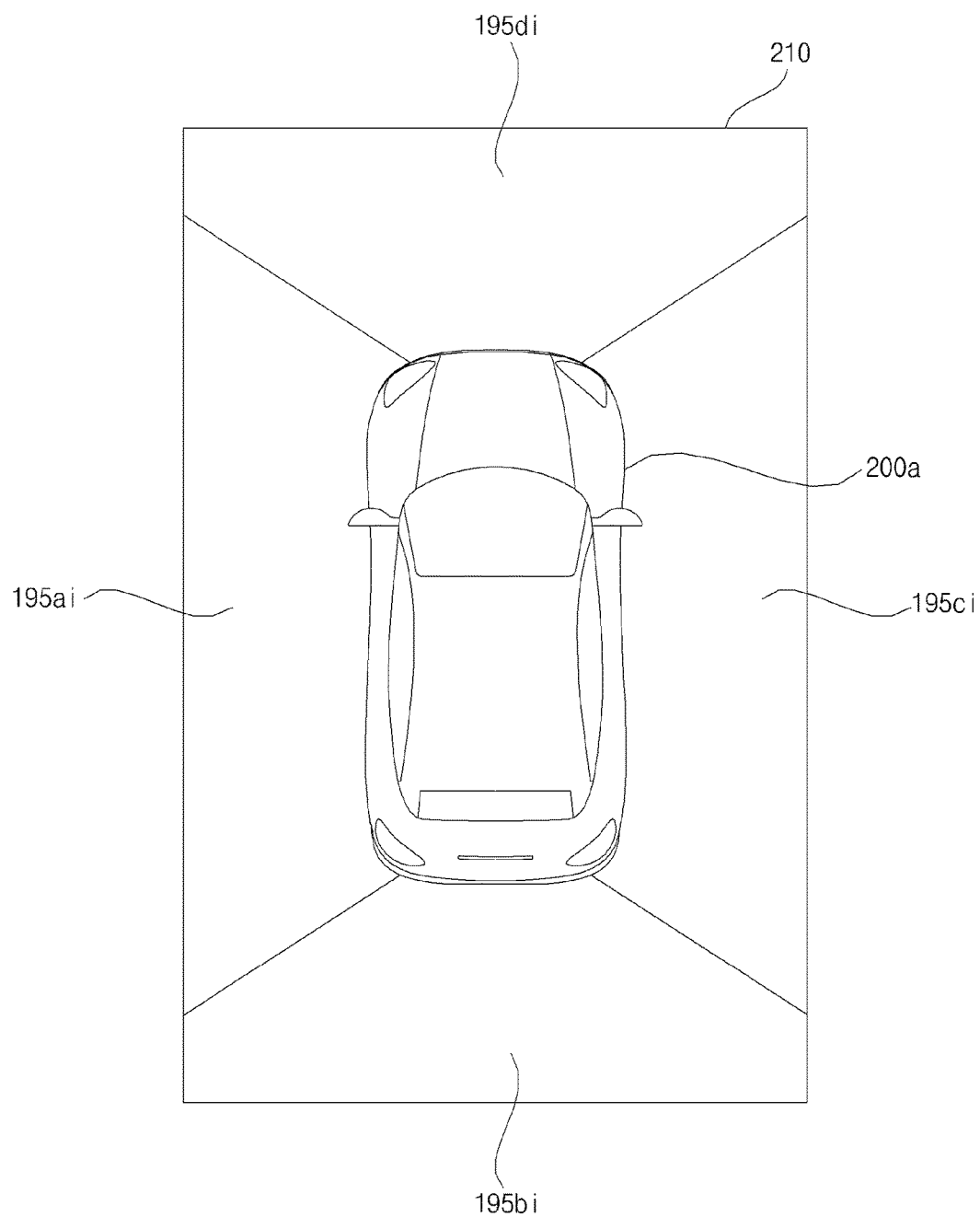
FIG. 2B is a view showing an around view image based on images photographed by the around view cameras of FIG. 2A.

FIG. 2A is a view schematically showing positions of the around view cameras attached to the vehicle shown in FIG. 1 and FIG. 2B is a view illustrating an around view image based on images captured by the around view cameras of FIG. 2A.

Referring first to FIG. 2A, the around view cameras 195a, 195b, 195c, and 195d may be disposed at the left side, the rear, the right side, and the front of the vehicle, respectively. In particular, the left side view camera 195a and the right side view camera 195c may be disposed in a case (or casing, housing, cover, etc.) surrounding a left side view mirror and a case surrounding a right side view mirror, respectively. On the other hand, the rear view camera 195b and the front view camera 195d may be disposed around a trunk switch and at an emblem or around the emblem, respectively.

A plurality of images captured by the around view cameras 195a, 195b, 195c, and 195d may be transmitted to a processor 170 (see FIG. 3A or 3B) in the vehicle 200. The processor 170 (see FIG. 3A or 3B) may combine the images to generate an around view image.

FIG. 2B shows an example of an around view image 210. The around view image 210 may include a first image region 195ai from the left side view camera 195a, a second image region 195bi from the rear view camera 195b, a third image region 195ci from the right side view camera 195c, and a fourth image region 195di from the front view camera 195d.

Figure 3A:
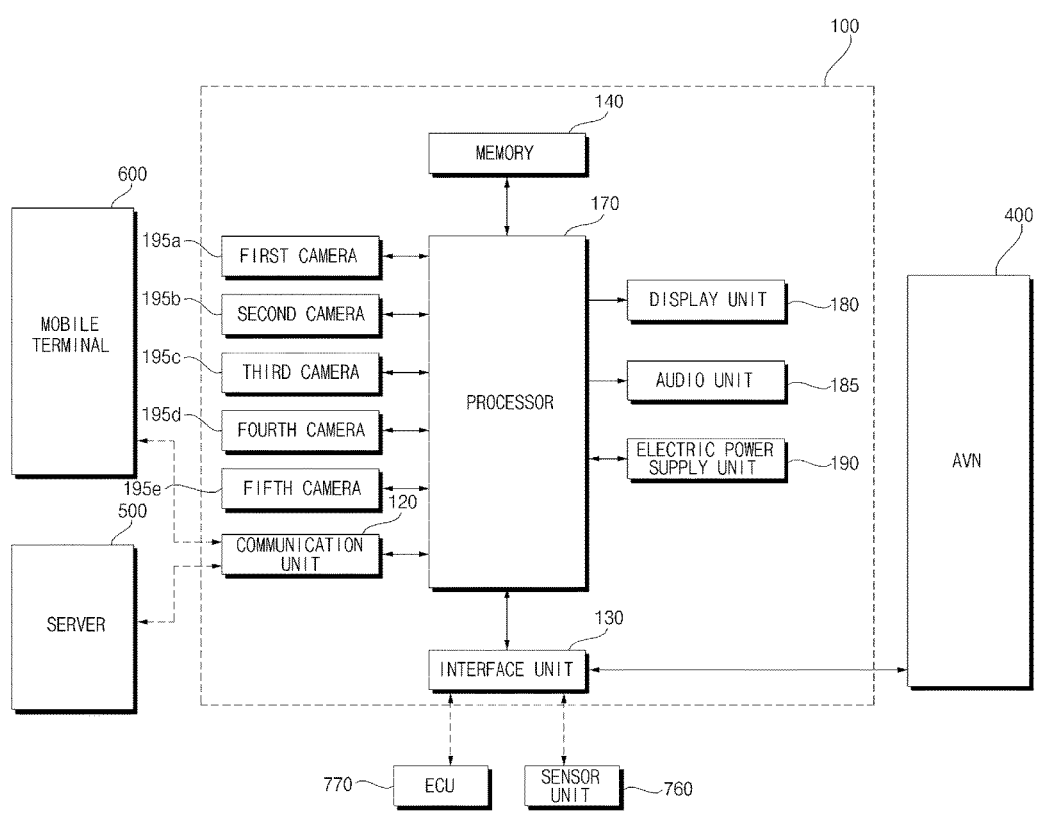
FIGS. 3A and 3B are internal block diagrams showing various examples of an around view provision apparatus according to an embodiment of the present disclosure.
Figure 3B:
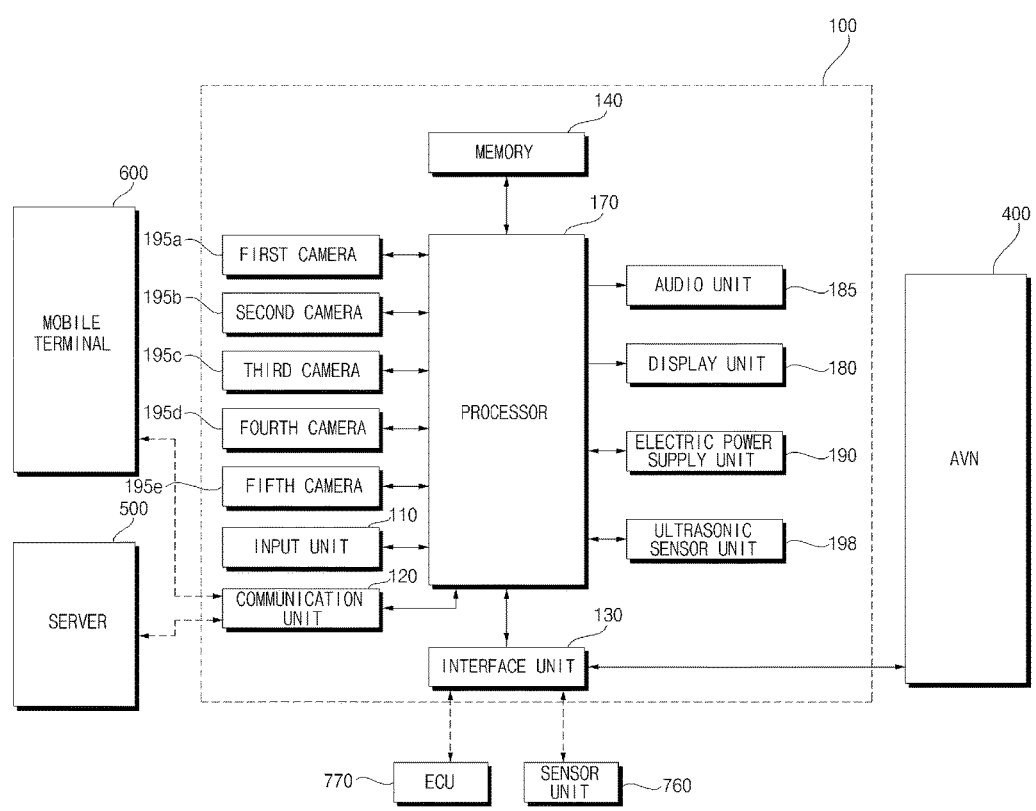

FIGS. 3A and 3B are internal block diagrams showing various examples of an around view provision apparatus according to an embodiment of the present disclosure. An around view provision apparatus 100 shown in FIGS. 3A and 3B may combine a plurality of images captured by a plurality of cameras 195a, 195b, 195c, and 195d to generate an around view image. On the other hand, the around view provision apparatus 100 may also detect, verify, track and display an object around the vehicle based on a plurality of images captured by the cameras 195a, 195b, 195c, and 195d.

Referring first to FIG. 3A, the around view provision apparatus 100 may include a communication unit 120, an interface unit 130, a memory 140, a processor 170, a display unit 180, an audio unit 185, an electric power supply unit 190, and a plurality of around view cameras 195a, 195b, 195c, 195d, and 195e. The audio unit 185 may include an audio input and/or an audio output devices.

The communication unit 120 may exchange data with a mobile terminal 600 or a server 500 in a wireless fashion. In particular, the communication unit 120 may exchange data with a mobile terminal of the driver in a wireless fashion. To this end, various wireless data communication protocols, such as Bluetooth, Wi-Fi, Wi-Fi Direct, and APiX, may be used.

The communication unit 120 may receive weather information and road traffic state information, such as Transport Protocol Expert Group (TPEG) information, from the mobile terminal 600 or the server 500. On the other hand, the communication unit 120 may transmit real-time traffic information acquired by the around view provision apparatus 100 based on images to the mobile terminal 600 or the server 500. When a user gets into the vehicle, a mobile terminal 600 of the user may pair with the around view provision apparatus 100 automatically or by the user executing an application.

The interface unit 130 may receive vehicle-related data or transmit a signal processed or generated by the processor 170 to the outside. To this end, the interface unit 130 may perform data communication with an electronic control unit (ECU) 770, an audio and video navigation (AVN) apparatus 400, and a sensor unit 760 in the vehicle in a wired communication fashion or a wireless communication fashion.

The interface unit 130 may receive map information related to vehicle travel through data communication with the AVN apparatus 400. On the other hand, the interface unit 130 may receive sensor information from the ECU 770 and the sensor unit 760.

The sensor information may include at least one selected from among vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, and in-vehicle humidity information.

Of the above-specified sensor information, the vehicle heading information, the vehicle position information, the vehicle angle information, the vehicle speed information, and the vehicle tilt information, which are related to vehicle travel, may be referred to as vehicle travel information.

The memory 140 may store various data for overall operation of the around view provision apparatus 100, such as programs for processing or control of the processor 170.

The audio unit 185 may convert an electric signal received from the processor 170 into an audio signal and outputs the audio signal. To this end, the audio unit 185 may include a speaker. The audio unit 185 may output a sound corresponding to an operation of an input unit (not shown), e.g. a button. The audio input unit may detect a user's voice. To this end, the audio input unit may include a microphone. The received voice may be converted into an electric signal, which may be transmitted to the processor 170.

The processor 170 may control overall operation of each unit in the around view provision apparatus 100. In particular, the processor 170 may acquire a plurality of images from the cameras 195a, 195b, 195c, and 195d and combine the acquired images to generate an around view image.

On the other hand, the processor 170 may perform signal processing based on computer vision. For example, the processor 170 may calculate disparity for a view around the vehicle based on the acquired images or the generated around view image, detect an object in the image based on calculated disparity information, and continuously track motion of the object after detection of the object.

In particular, during detection of the object, the processor 170 may perform lane detection, adjacent vehicle detection, pedestrian detection, and road surface detection. In addition, the processor 170 may calculate the distance to the detected adjacent vehicle or the detected pedestrian.

On the other hand, the processor 170 may receive sensor information from the ECU 770 or the sensor unit 760 through the interface unit 130. The sensor information may include at least one of vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, or in-vehicle humidity information.

The display unit 180 may display the around view image generated by the processor 170. During display of the around view image, the display unit 180 may provide various user interfaces. In addition, the display unit 180 may include a touch sensor to sense a touch input to each user interface.

Meanwhile, the display unit 180 may include a cluster or a head up display (HUD) provided at the inside front of the vehicle. In a case in which the display unit 180 is the HUD, the display unit 180 may include a projection module to project an image on the front windshield glass of the vehicle 200.

The electric power supply unit 190 may supply electric power to the respective components under control of the processor 170. In particular, electric power from an in-vehicle battery may be supplied to the electric power supply unit 190.

The cameras 195a, 195b, 195c, and 195d may be cameras to provide an around view image. The cameras 195a, 195b, 195c, and 195d may be wide-angle cameras. Moreover, the around view provision apparatus may include additional cameras.

For example, a camera 195e may be an indoor camera mounted in the vehicle to photograph a user, specifically a driver. The processor 170 may detect the position of the driver based on an image from the indoor camera, set a region that cannot be observed by a side view mirror or a rear view mirror based on the position of the driver (e.g., blind spot), and control at least one of the cameras to be operated in a first mode, which is referred to as a blind spot detection (BSD) mode, in which at least one of the cameras is moved (e.g., tilted or rotated) to photograph the region that cannot be observed by the side view mirror or the rear view mirror.

Referring now to FIG. 3B, the around view provision apparatus 100 of FIG. 3B may be similar to the around view provision apparatus 100 of FIG. 3A except that the around view provision apparatus 100 of FIG. 3B may further include an input unit 110 and a sensor unit 198. In a non-limiting example, the sensor unit 198 may include ultrasonic sensors, and the sensor unit 198 may be referred to as an ultrasonic sensor unit 198. Hereinafter, for sake of brevity, a description will be given of only the input unit 110 and the ultrasonic sensor unit 198.

The input unit 110 may include a plurality of buttons attached around the display unit 180 or a touchscreen disposed on the display unit 180. The around view provision apparatus 100 may be powered on through the buttons or the touchscreen such that the around view provision apparatus 100 can be operated. On the other hand, various input operations may be performed through the input unit 110.

The ultrasonic sensor unit 198 may include a plurality of ultrasonic sensors. In a case in which the ultrasonic sensors are mounted in the vehicle, the ultrasonic sensor unit 198 may sense an object around the vehicle based on a difference between transmitted ultrasonic waves and received ultrasonic waves.

Unlike FIG. 3B, on the other hand, Light Detection And Ranging (LiDAR) (not shown) may be provided instead of the ultrasonic sensor unit 198. Alternatively, both the ultrasonic sensor unit 198 and the LiDAR may be provided.

Figure 4A:
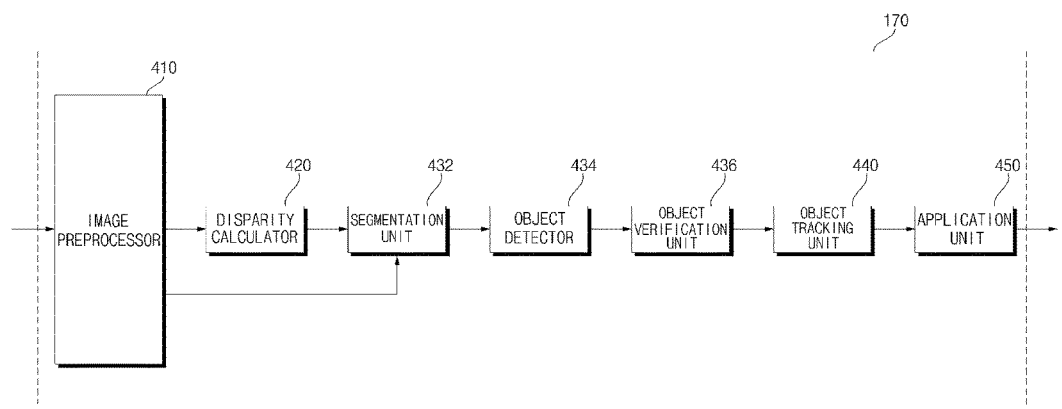
FIGS. 4A and 4B are internal block diagrams showing various examples of a processor shown in FIG. 3.
Figure 4B:
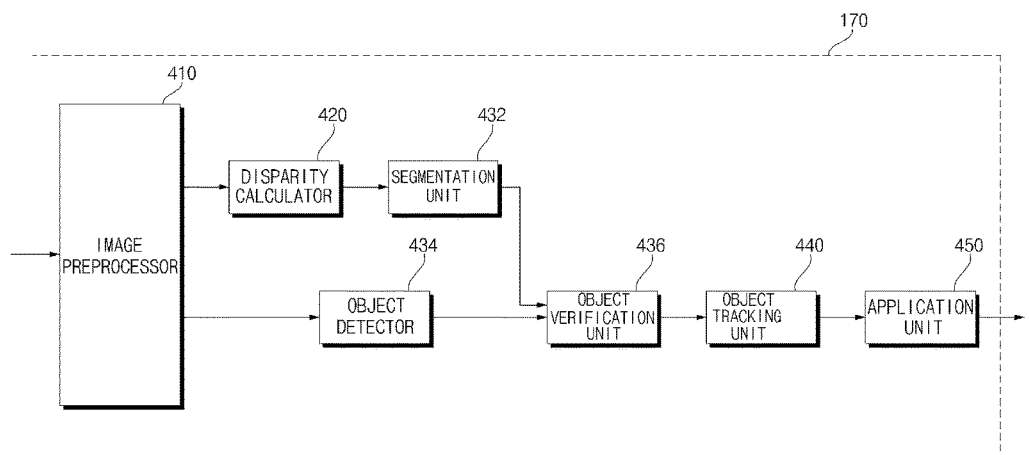
Figure 5:
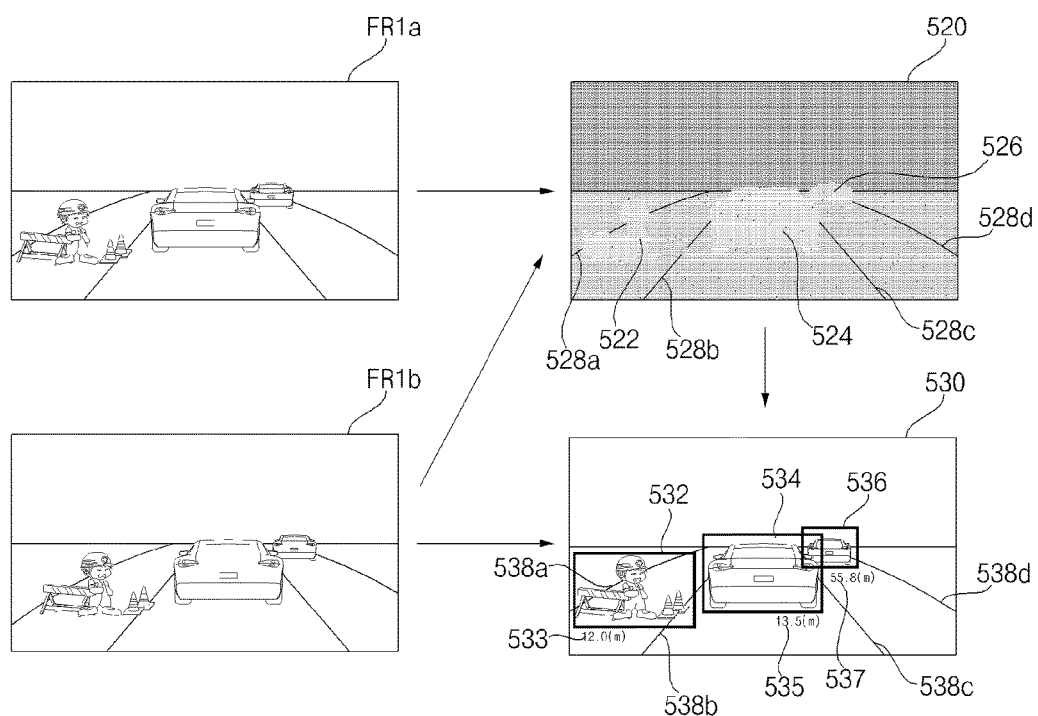
FIG. 5 is a series of views showing object detection performed by the processor of FIGS. 4A and 4B.

FIGS. 4A and 4B are internal block diagrams showing various examples of the processor shown in FIG. 3 and FIG. 5 is a series of views showing object detection performed by the processor of FIGS. 4A and 4B.

Referring first to FIG. 4A, which is an internal block diagram showing an example of the processor 170, the processor 170 of the around view provision apparatus 100 may include an image preprocessor 410, a disparity calculator 420, a segmentation unit 432, an object detector 434, an object verification unit 436, an object tracking unit 440, and an application unit 450.

The image preprocessor 410 may receive a plurality of images from the cameras 195a, 195b, 195c, and 195d or a generated around view image and may preprocess the plurality of images or the generated around view image.

Specifically, the image preprocessor 410 may perform noise reduction, rectification, calibration, color enhancement, color space conversion (CSC), interpolation, camera gain control, or the like, for the plurality of images or the generated around view image. As a result, the image preprocessor 410 may acquire an image that is more vivid than the plurality of images from the cameras 195a, 195b, 195c, and 195d or the generated around view image.

The disparity calculator 420 may receive the plurality of images or the generated around view image signal-processed by the image preprocessor 410, sequentially perform stereo matching for the received plural images or the received around view image for a predetermined time, and acquire a disparity map based on the stereo matching. That is, the disparity calculator 420 may acquire disparity information for a view around the vehicle. The stereo matching may be performed on a per pixel basis or a per predetermined block basis of the images. Meanwhile, the disparity information may be included in a map showing binocular parallax information as values.

The segmentation unit 432 may perform segmentation and clustering in the images based on the disparity information from the disparity calculator 420. Specifically, the segmentation unit 432 may segment at least one of the images into a background and a foreground based on the disparity information.

For example, a region having a predetermined value or less of the disparity information in the disparity map may be calculated as a background and the region may be excluded. As a result, a foreground may be relatively separated from the image. In another example, a region having a predetermined value or more of the disparity information in the disparity map may be calculated as a foreground and the region may be extracted. As a result, the foreground may be separated from the image.

As described above, the image may be segmented into the background and the foreground based on the disparity information extracted based on the image. Therefore, signal processing speed and signal processing amount may be reduced during detection of an object.

The object detector 434 may detect an object based on the image segment from the segmentation unit 432. That is, the object detector 434 may detect an object for at least one of the images based on the disparity information. For example, the object detector 434 may detect an object from a foreground separated from the image by the image segment.

Subsequently, the object verification unit 436 may classify and verify the separated object. To this end, the object verification unit 436 may use a recognition method using a neural network, a support vector machine (SVM) method, a recognition method based on AdaBoost using a Haar-like feature, a histograms of oriented gradients (HOG) method, or another appropriate technique.

On the other hand, the object verification unit 436 may compare the detected object with objects stored in the memory 140 to verify the detected object. For example, the object verification unit 436 may verify an adjacent vehicle, a lane, a road surface, a traffic sign, a dangerous zone, a tunnel, etc. located around the vehicle.

The object tracking unit 440 may track the verified object. For example, the object tracking unit 440 may verify an object in images which are sequentially acquired, calculate motion or a motion vector of the verified object, and track movement of the object based on the calculated motion or the calculated motion vector. Consequently, the object tracking unit 440 may track an adjacent vehicle, a lane, a road surface, a traffic sign, a dangerous zone, etc. located around the vehicle.

FIG. 4B is an internal block diagram showing another example of the processor 170. The processor 170 of FIG. 4B is substantially the same as the processor 170 of FIG. 4A except that a signal processing sequence of the processor 170 of FIG. 4B is different from that of the processor 170 of FIG. 4A. Hereinafter, a description will be given of only the difference between the processor 170 of FIG. 4B and the processor 170 of FIG. 4A.

The object detector 434 may receive a plurality of images or a generated around view image and detect an object in the plurality of images or the generated around view image. Unlike FIG. 4A, the object detector 434 may not detect an object for an image segmented based on disparity information but may directly detect an object from the plurality of images or the generated around view image.

Subsequently, the object verification unit 436 may classify and verify the detected and separated object based on the image segment from the segmentation unit 432 and the object detected by the object detector 434. To this end, the object verification unit 436 may use a recognition method using a neural network, an SVM method, a recognition method based on AdaBoost using a Haar-like feature, a HOG method, or the like.

FIG. 5 is a series of reference views illustrating an operation of the processor 170 shown in FIG. 4A or 4B based on images acquired from first and second frame periods. The cameras 195a, 195b, 195c, and 195d may sequentially acquire images FR1a and FR1b during the first and second frame periods.

The disparity calculator 420 of the processor 170 may receive the images FR1a and FR1b signal-processed by the image preprocessor 410 and may perform stereo matching for the received images FR1a and FR1b to acquire a disparity map 520. The disparity map 520 may show a disparity between the images FR1a and FR1b as levels. When a disparity level is high, the distance to the vehicle may be calculated as being short. When a disparity level is low, on the other hand, the distance to the vehicle may be calculated as being long.

Meanwhile, in a case in which the disparity map is displayed, the disparity map may be displayed with higher brightness when the disparity level is higher and the disparity map may be displayed with lower brightness when the disparity level is lower.

By way of example, FIG. 5 shows that in the disparity map 520 first to fourth lanes 528a, 528b, 528c, and 528d may have their own disparity levels and a construction zone 522, a first preceding vehicle 524, and a second preceding vehicle 526 may have their own disparity levels.

The segmentation unit 432, the object detector 434, and the object verification unit 436 may respectively perform segmentation, object detection, and object verification for at least one of the images FR1a and FR1b based on the disparity map 520. Moreover, object detection and object verification for the second image FR1b may be performed using the disparity map 520. That is, object detection and object verification for first to fourth lanes 538a, 538b, 538c, and 538d, a construction zone 532, a first preceding vehicle 534, and a second preceding vehicle 536 in an image 530 may be performed.

Meanwhile, images may be continuously acquired and the object tracking unit 440 may track verified objects.

Figure 6:
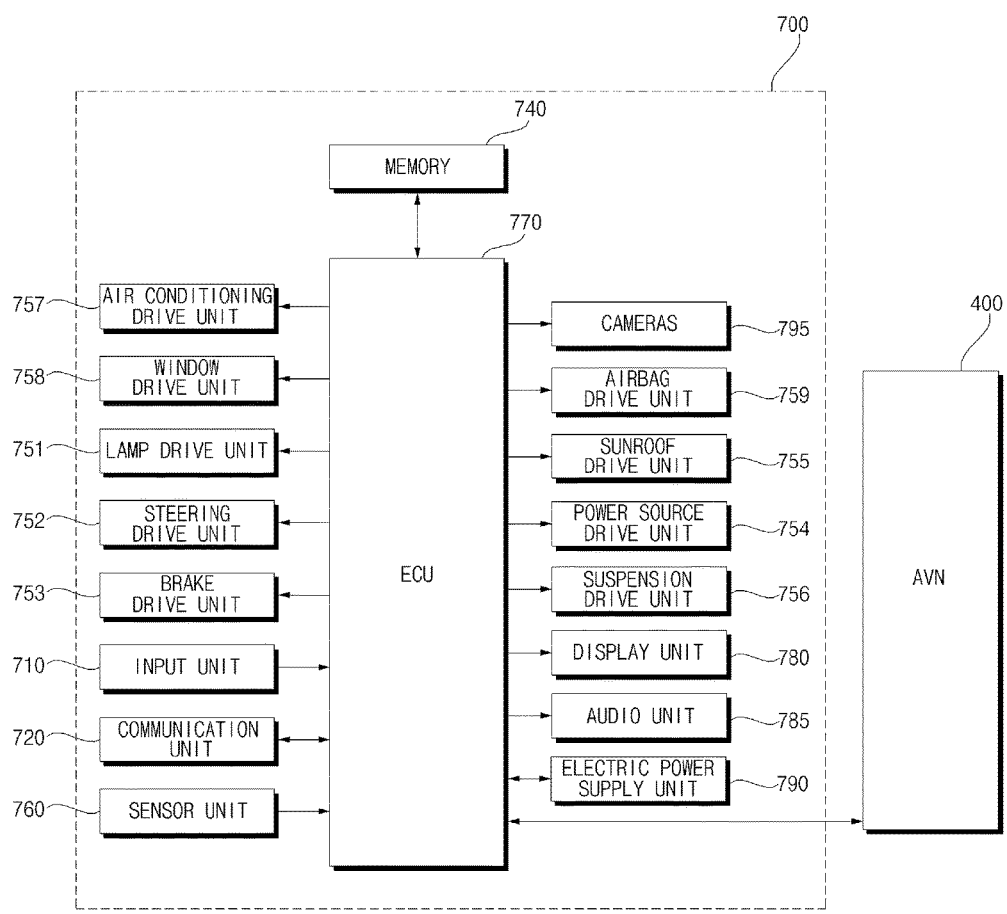
FIG. 6 is an internal block diagram showing an example of a vehicle according to an embodiment of the present disclosure.

FIG. 6 is an internal block diagram showing an example of a vehicle according to an embodiment of the present disclosure. The vehicle 200 may include an electronic control apparatus 700 for vehicle control. The electronic control apparatus 700 may exchange data with the AVN apparatus 400.

The electronic control apparatus 700 may include an input unit 710, a communication unit 720, a memory 740, a lamp drive unit 751, a steering drive unit 752, a brake drive unit 753, a power source drive unit 754, a sunroof drive unit 755, a suspension drive unit 756, an air conditioning drive unit 757, a window drive unit 758, an airbag drive unit 759, a sensor unit 760, an ECU 770, a display unit 780, an audio unit 785, an electric power supply unit 790, and a plurality of cameras 795.

Meanwhile, the ECU 770 may include a processor. Alternatively, an additional processor to signal-process images from the cameras may be provided in addition to the ECU 770. The input unit 710 may include a plurality of buttons or a touchscreen provided in the vehicle 200. Various input operations may be performed through the buttons or the touchscreen.

The communication unit 720 may exchange data with the mobile terminal 600 or the server 500 in a wireless fashion. In particular, the communication unit 720 may exchange data with a mobile terminal of the driver in a wireless fashion. To this end, various wireless data communication protocols, such as Bluetooth, Wi-Fi, Wi-Fi Direct, and APiX, may be used.

In one example, the communication unit 720 may receive weather information and road traffic state information, such as TPEG information, from the mobile terminal 600 or the server 500. When a user gets into the vehicle, a mobile terminal 600 of the user may pair with the electronic control apparatus 700 automatically or by the user executing an application.

The memory 740 may store various data for overall operation of the electronic control apparatus 700, such as programs for processing or control of the ECU 770.

The lamp drive unit 751 may control turn on/turn off of lamps provided inside and outside the vehicle. In addition, the lamp drive unit 751 may control intensity, direction, etc. of light emitted from each lamp. For example, the lamp drive unit 751 may control a direction indicating lamp, a brake lamp, etc.

The steering drive unit 752 may electronically control a steering apparatus (not shown) in the vehicle 200. Consequently, the steering drive unit 752 may change a heading of the vehicle.

The brake drive unit 753 may electronically control a brake apparatus in the vehicle 200. For example, the brake drive unit 753 may control an operation of a brake mounted at each wheel to reduce speed of the vehicle 200. In another example, the brake drive unit 753 may differently control operations of brakes mounted at left wheels and right wheels to adjust the heading of the vehicle 200 to the left or the right.

The power source drive unit 754 may electronically control a power source in the vehicle 200. For example, in a case in which the power source is an engine using fossil fuel, the power source drive unit 754 may electronically control the engine. Consequently, the power source drive unit 754 may control output torque of the engine. In another example, in a case in which the power source is an electric motor, the power source drive unit 754 may control the motor. Consequently, the power source drive unit 754 may control rotational speed and torque of the motor.

The sunroof drive unit 755 may electronically control a sunroof apparatus in the vehicle 200. For example, the sunroof drive unit 755 may control a sunroof to be opened or closed.

The suspension drive unit 756 may electronically control a suspension apparatus in the vehicle 200. For example, in a case in which a road surface is uneven, the suspension drive unit 756 may control the suspension apparatus to reduce vibration of the vehicle 200.

The air conditioning drive unit 757 may electronically control an air conditioner in the vehicle 200. For example, in a case in which the internal temperature of the vehicle is high, the air conditioning drive unit 757 may control the air conditioner to supply cool air into the vehicle.

The window drive unit 758 may electronically control a window apparatus in the vehicle 200. For example, the window drive unit 758 may control left and right side windows of the vehicle to be opened or closed.

The airbag drive unit 759 may electronically control an airbag apparatus in the vehicle 200. For example, the airbag drive unit 759 may control an airbag to deploy in a dangerous situation.

The sensor unit 760 may sense a signal related to travel of the vehicle 200. To this end, the sensor unit 760 may include a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, an in-vehicle humidity sensor or another appropriate type of sensor.

Consequently, the sensor unit 760 may acquire a sensing signal for vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, in-vehicle humidity information, and the like. In addition, the sensor unit 760 may further include an engine speed sensor, an air flow sensor (AFS), an intake air temperature sensor (ATS), a water temperature sensor (WTS), a throttle position sensor (TPS), a top dead center (TDC) sensor, and a crank angle sensor (CAS).

The ECU 770 may control overall operation of each unit in the electronic control apparatus 700. The ECU 770 may perform a specific operation based on an input through the input unit 710, receive and transmit a signal sensed by the sensor unit 760 to the around view provision apparatus 100, receive map information from the AVN apparatus 400, or control operations of the respective drive units 751, 752, 753, 754, and 756. In addition, the ECU 770 may receive weather information and road traffic state information, such as TPEG information, from the communication unit 720.

On the other hand, the ECU 770 may combine a plurality of images received from the plurality of cameras 795 to generate an around view image. In particular, when the vehicle moves forward at a predetermined speed or less or when the vehicle moves backward, the ECU 770 may generate an around view image. The display unit 780 may display the generated around view image. In particular, the display unit 180 may provide various user interfaces in addition to the around view image.

In order to display the around view image, etc., the display unit 780 may include a cluster or an HUD provided at the inside front of the vehicle. In a case in which the display unit 180 is the HUD, the display unit 180 may include a projection module to project an image on the front windshield glass of the vehicle 200. Meanwhile, the display unit 780 may include a touchscreen to allow input by tapping on the screen.

The audio unit 785 may convert an electric signal received from the ECU 770 into an audio signal and output the audio signal. To this end, the audio unit 785 may include a speaker. The audio unit 785 may output a sound corresponding to an operation of the input unit 710, e.g. a button.

The audio unit 785 may also include a microphone to receive sound. Hence, the audio unit 785 may include an audio input unit and an audio unit.

The electric power supply unit 790 may supply electric power to the respective components under control of the ECU 770. In particular, electric power from an in-vehicle battery may be supplied to the electric power supply unit 790.

The plurality of cameras 795 may be used to provide an around view image. To this end, the plurality of cameras 795 may include four cameras as shown in FIG. 2A. For example, a plurality of around view cameras 195*a*, 195*b*, 195*c*, and 195*d* may be disposed at the left side, the rear, the right side, and the front of the vehicle, respectively. A plurality of images captured by the plurality of cameras 795 may be transmitted to the ECU 770 or an additional processor.

Meanwhile, the position of at least one of the around view cameras 195*a*, 195*b*, 195*c*, and 195*d* may be changed during travel of the vehicle or at the time of parking the vehicle.

For example, in a case in which impact applied to the vehicle when the vehicle crosses a speed bump during travel of the vehicle is equal to or greater than a predetermined level, the position of at least one of the around view cameras 195*a*, 195*b*, 195*c*, and 195*d* may be changed. In another example, the position of at least one selected from between the left side view camera 195*a* and the right side view camera 195*c* may be changed by a pedestrian or another vehicle being parked at the side of the vehicle in a state in which the vehicle is parked.

In a case in which the processor 170 combines images captured by the around view cameras 195*a*, 195*b*, 195*c*, and 195*d* to generate an around view image in a state in which the position of at least one of the cameras 195*a*, 195*b*, 195*c*, and 195*d* is changed as described above, edge increase or image tearing may be caused at a boundary region between the corresponding images.

In order to prevent the occurrence of the above-mentioned phenomena, the present disclosure proposes automatic calibration of the around view cameras 195*a*, 195*b*, 195*c*, and 195*d*. For example, offset information may be calculated through comparison between reference images for the around view cameras 195*a*, 195*b*, 195*c*, and 195*d* and images captured by the around view cameras 195*a*, 195*b*, 195*c*, and 195*d* and an around view image may be generated using the calculated offset information, which will hereinafter be described with reference to FIGS. 7 to 14.

In another example, gyro sensors may be used to calibrate the cameras rather than the reference images. Here, offset information may be calculated based on a difference between reference position information and current position information of the around view cameras 195*a*, 195*b*, 195*c*, and 195*d* through gyro sensors provided in the around view cameras 195*a*, 195*b*, 195*c*, and 195*d* and an around view image may be generated using the calculated offset information, which will hereinafter be described with reference to FIGS. 15 to 16C.

Figure 7:
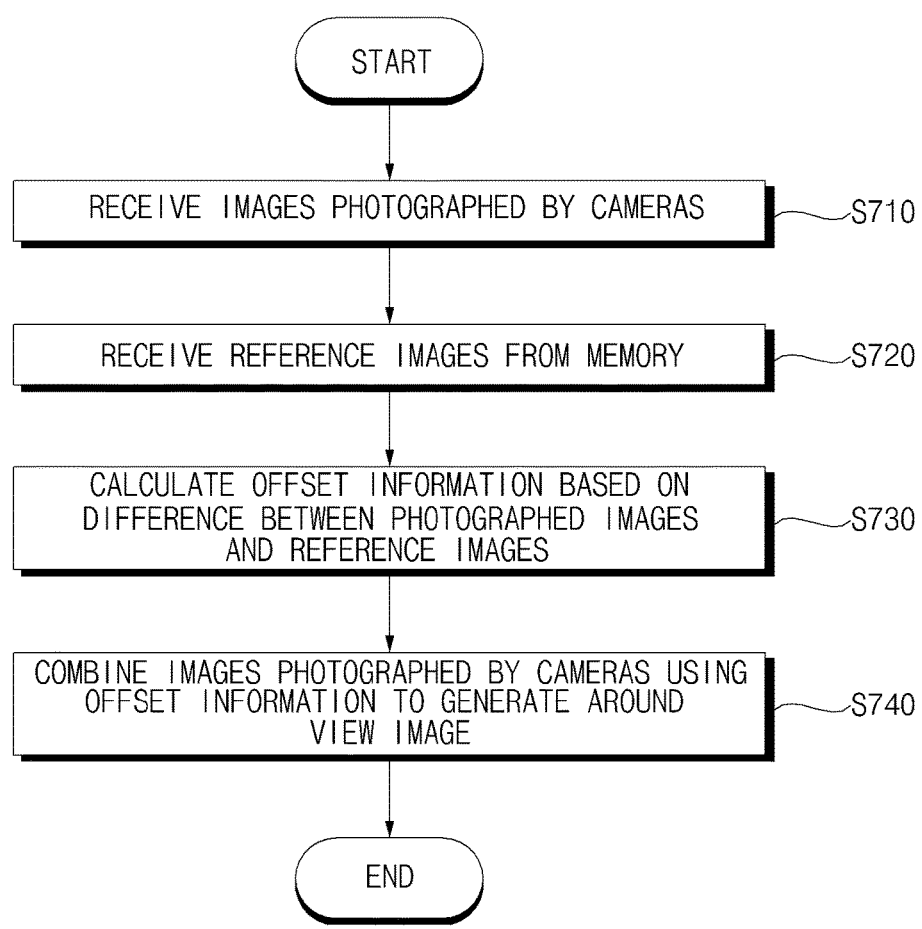
FIG. 7 is a flowchart of method of operating the around view provision apparatus according to the embodiment of the present disclosure.

FIG. 7 is a flowchart of a method of operating an around view provision apparatus according to embodiments of the present disclosure and FIGS. 8A to 16C are reference views illustrating the method of operation of the around view provision apparatus shown in FIG. 7.

Referring first to FIG. 7, the processor 170 of the around view provision apparatus 100 may receive images captured by the around view cameras 195*a*, 195*b*, 195*c*, and 195*d*, in Step S710.

As shown in FIG. 2A, the around view cameras 195a, 195b, 195c, and 195d may be disposed at the left side, the rear, the right side, and the front of the vehicle, respectively. For example, the left side view camera 195a and the right side view camera 195c may be disposed in the case surrounding the left side view mirror and the case surrounding the right side view mirror, respectively. On the other hand, the rear view camera 195b and the front view camera 195d may be disposed around the trunk switch and at the emblem or around the emblem, respectively. The images captured by the around view cameras 195a, 195b, 195c, and 195d may be transmitted to the processor 170 in the vehicle 200.

Subsequently, the processor 170 of the around view provision apparatus 100 may receive reference images for the around view cameras 195a, 195b, 195c, and 195d from the memory 140, in Step S720. Upon receiving the images captured by the around view cameras 195a, 195b, 195c, and 195d, the processor 170 of the around view provision apparatus 100 may request the reference images for the around view cameras 195a, 195b, 195c, and 195d from the memory 140 for image calibration. The image calibration may be performed at the time of starting the vehicle, at the time of manipulating a side view mirror, or when an impact applied to the vehicle during travel of the vehicle is greater than or equal to a predetermined level. For example, the impact may be caused by traversing rough terrain or when a camera is otherwise caused to shift out of position.

Upon receiving the request to transmit the reference images, the memory 140 may transmit the reference images. At the time of starting the vehicle, the memory 140 may transmit reference images related to an area at which the vehicle is located, such as a parking lot. At the time of manipulating the side view mirror or when impact applied to the vehicle during travel of the vehicle is greater than or equal to the predetermined level, the memory 140 may transmit reference images containing a region related to the vehicle or images containing reference objects, such as a lane.

Subsequently, the processor 170 of the around view provision apparatus 100 may calculate offset information based on a difference between the captured images and the reference images, in Step S730. For example, when the reference images and the captured images each contain a character line of the vehicle, the processor 170 may calculate offset information based on a difference between the character line contained in the reference images and the character line contained in the captured images. The character line of the vehicle may include a hood emblem, a hood edge line, or the like.

When the reference images and the captured images each contain an object outside the vehicle, on the other hand, the processor 170 may calculate offset information based on a difference between the object contained in the reference images and the object contained in the captured images. The object outside the vehicle may include at least one selected from among a speed bump in the parking lot, a post, a traffic sign, a signal light, a streetlight, or another appropriate type of object commonly found in the vicinity of the vehicle.

Meanwhile, in a case in which the offset information is greater than equal to a predetermined level, the processor 170 may control a notification message indicating that it is not possible to generate an around view image to be output through an output unit such as the display unit 180 or the audio unit 185.

On the other hand, the processor 170 may calculate offset information when the vehicle is started, when the side view mirror is manipulated, or when an impact to the vehicle during travel is greater than equal to a predetermined level.

Meanwhile, the processor 170 may calculate a first offset information based on a reference image for the first camera 195a among the first to fourth cameras 195a, 195b, 195c, and 195d and an image captured by the first camera 195a. The calculated first offset information may also be applied to at least one of the second to fourth cameras to calibrate images from these cameras. Here, the calculated first offset information may be applied in consideration of a known relative positioning of each of the cameras or the images captured by those cameras.

For example, the calculated first offset information may be used to calculate offset information for the remaining cameras without analyzing the images from the remaining cameras or applying the same offset information to all of the cameras. While each camera may be separately calibrated using respective reference images and captured images, this may cause delays in calibration. In certain situations, such as when only one camera is out of calibration, it may be desirable to perform calibration using images for only that camera. Hence, relative positioning information for the cameras or images captured from each of the cameras may be stored. When one of the cameras is calibrated using the stored reference image and captured image, the calculated offset information may be used to calibrate images of the remaining cameras using the stored relative positioning information rather than performing separate calibrations for each of the cameras or applying the same offset information to all of the cameras. As a result, it is possible to easily and conveniently use common offset information even in a case in which the position of at least one of the cameras is changed.

Subsequently, the processor 170 of the around view provision apparatus 100 may combine the images captured by the around view cameras 195a, 195b, 195c, and 195d using the offset information to generate an around view image, in Step S740. The processor 170 may control the image-calibrated around view image to be displayed through the display unit 180.

At this time, the processor 170 may control a region calibrated by the offset information to be separately displayed or a calibration quantity to be displayed on the around view image displayed through the display unit 180. As a result, user convenience may be improved.

On the other hand, the processor 170 may control the around view image generated using the offset information and a second around view image generated without using the offset information to be simultaneously displayed on the display unit 180. Meanwhile, in a case in which the around view image is selected from between the around view image and the second around view image displayed on the display unit 180, the processor 170 may control the around view image to be generated through continuous use of the offset information. As a result, user convenience may be improved.

On the other hand, upon receiving a user input in a state in which the around view image is displayed on the display unit 180 and the region calibrated by the offset information is separately displayed or the calibration quantity is displayed on the around view image, the processor 170 may control at least one selected from among the calibrated region, the calibration quantity, or the offset information to be changed in response to the user input. As a result, user convenience and control may be improved.

Figure 8A:
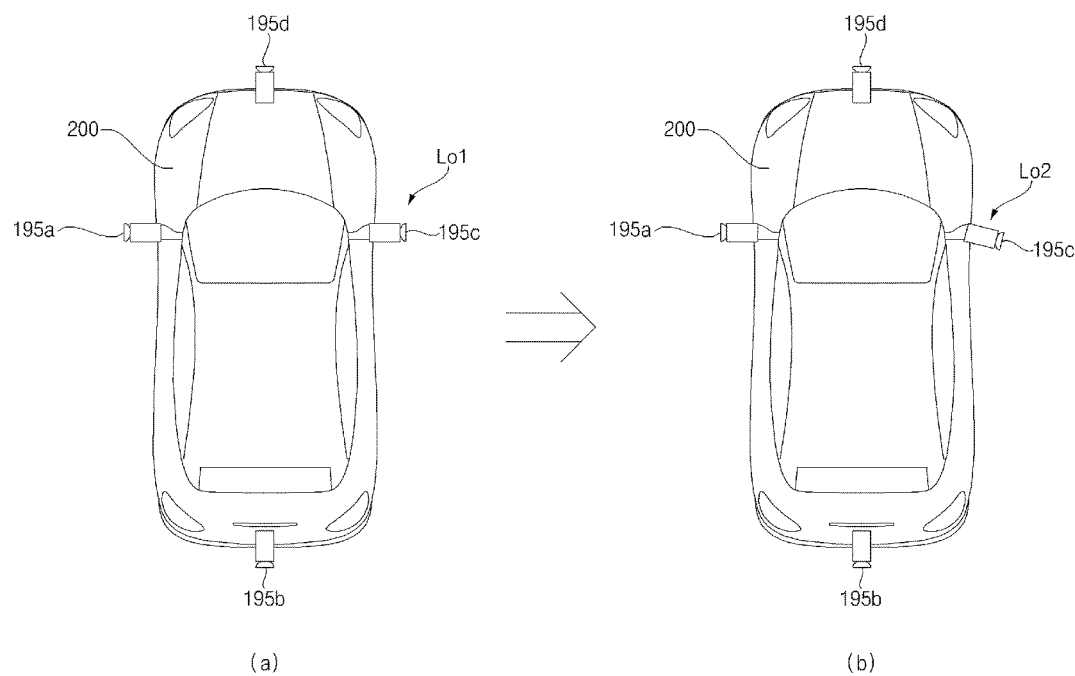
FIGS. 8A to 16C are reference views illustrating the method of operating the around view provision apparatus shown in FIG. 7.
Figure 8B:
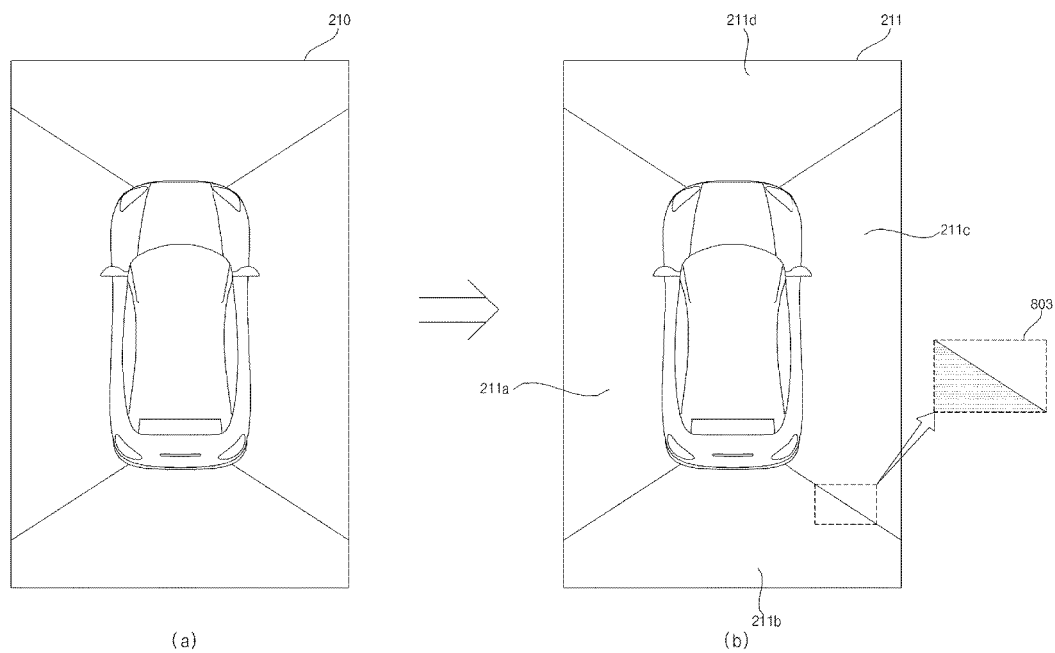

FIGS. 8A and 8B illustrate, by way of example, in a case in which the position of the right side view camera 195c of the around view cameras 195a, 195b, 195c, and 195d is changed, image tearing may be caused at a portion of an around view image generated in response thereto. For example, referring to FIG. 8A, a position of the right side view camera 195*c* among the around view cameras 195*a*, 195*b*, 195*c*, and 195*d* may be changed or shifted out of position. The right side view camera 195*c* may not be directed in a right side direction Lo1, but rather is directed in a right side rear direction Lo2.

In a case in which the position of the right side view camera 195*c* is out of position as described above, image tearing may result at a boundary region between the corresponding images during generation of an around view image. FIG. 8B(a) shows, by way of example, an around view image 210 in a case in which the right side view camera 195*c* is normally positioned and FIG. 8B(b) shows, by way of example, an around view image 211 generated while the right side view camera 195*c* is turned out of position in the right side rear direction.

Image tearing or edge increase may be caused at a boundary region 803 between an image 211*b* captured by the rear view camera 195*b* and an image captured by the right side view camera 195*c*. As a result, the boundary region 803 may cause the around view image 211 to appear unnatural or the tearing to be noticeable to the user.

In order to solve the above problem, the present disclosure proposes a method of calibrating using a comparison between reference images and captured images, a comparison between reference position information and current position information of the cameras using gyro sensors, or based on a combination of the two methods.

Figure 9A:
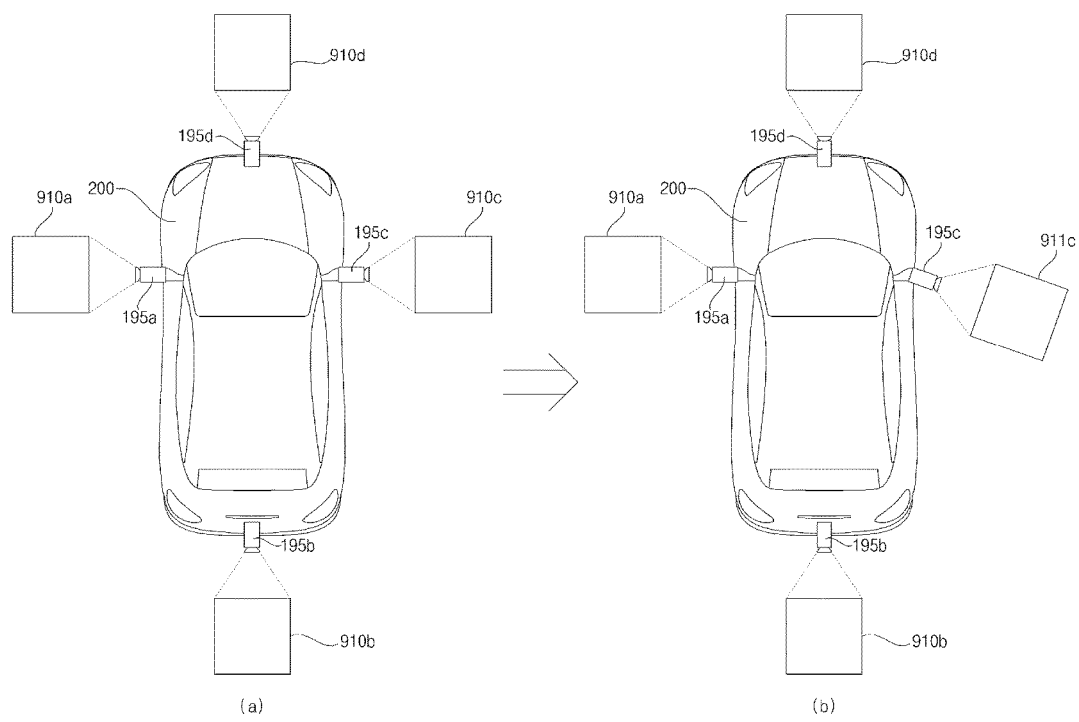

FIG. 9A shows, by way of example, an image captured by the right side view camera 195*c* in a case in which the right side view camera 195*c* is normally positioned and an image captured by the right side view camera 195*c* in a case in which the right side view camera 195*c* is turned in the right side rear direction.

As shown in FIG. 9A(a), images 910*a*, 910*b*, 910*c*, and 910*d* may be captured by the around view cameras 195*a*, 195*b*, 195*c*, and 195*d*, respectively. As shown in FIG. 9A(b), images 911*a*, 911*b*, 911*c*, and 911*d* may be captured by the around view cameras 195*a*, 195*b*, 195*c*, and 195*d*, respectively. In comparing FIGS. 9A(a) and 9A(b), it can be seen that the right side view camera 195*c* is turned in the right side rear direction with the result that the images 910*c* and 911 *c* captured by the right side view camera 195*c* are different from each other.

Figure 9B:
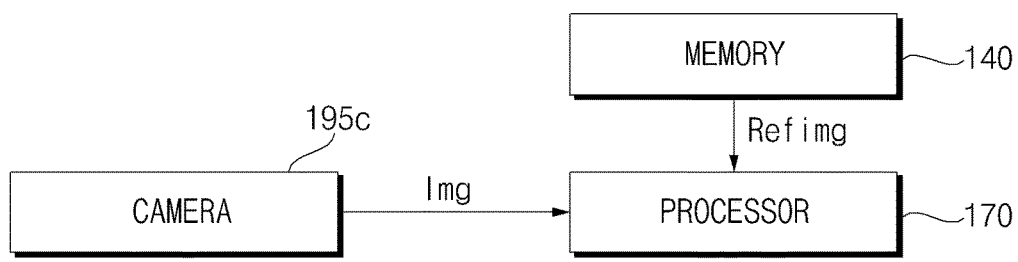

The processor 170 may calculate offset information using this difference. That is, as shown in FIG. 9B, the processor 170 may receive a reference image for the right side view camera 195*c*, e.g. the image 910*c* shown in FIG. 9A(a), from the memory and receive the captured image 911*c* from the right side view camera 195*c*.

The processor 170 may calculate a difference between the reference image 910*c* and the captured image 911*c* and calculate offset information based on the difference therebetween. For example, since the right side view camera 195*c* is turned in the right side rear direction, the processor 170 may calculate offset information to partially calibrate the captured image in a left side front direction.

Figure 9C:
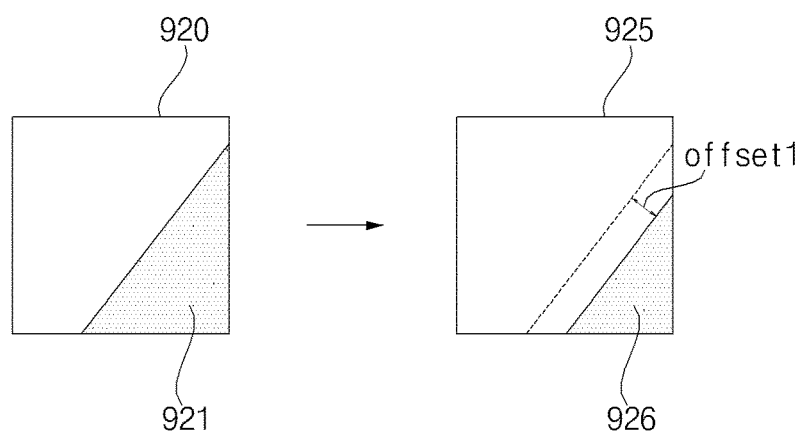

FIG. 9C shows another example of a reference image and a captured image. For example, a predetermined object 921 may be contained in a reference image 920 and an object 926 may be contained in an image 925 captured by the right side view camera 195*c* in a state where the camera has shifted in the right side rear direction.

The processor 170 may calculate a difference between the reference image 920 and the captured image 925 and calculate offset information based on the difference therebetween. That is, the processor 170 may calculate offset information offset1 to partially calibrate the captured image 925, for example, in the left side front direction based on the difference in position between the objects 921 and 926.

In addition, the processor 170 may calibrate the captured image 925 using the calculated offset information offset1. That is, the processor 170 may control the captured image 925 to be calibrated so as to be identical to the reference image 920. It should be appreciated that the offset information offset1 may be a gap between images 925 and 926 or an overlap between images 925 and 926 based on the direction in which the camera has shifted. Moreover, the predetermined object 921 and the corresponding captured image 926 may be images of a variety of types of objects, such as a portion of the vehicle or an external object, places, etc., for use in the comparison.

Figure 9D:
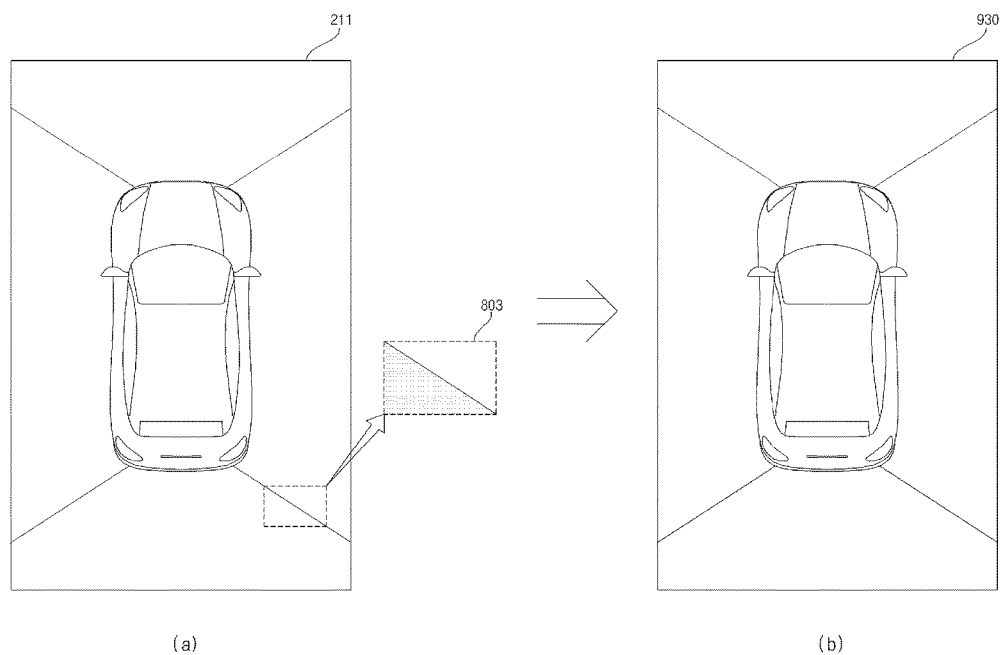

FIG. 9D(a) shows, by way of example, that image tearing or edge increase may be caused at a boundary region 803 between an image captured by the rear view camera 195*b* and an image captured by the right side view camera 195*c* in an around view image 211. FIG. 9D(b) shows, by way of example, an around view image 930 calibrated by the processor 170 based on the offset information. Here, no image tearing is visible at the boundary region 803 with the result that the image appears more natural. In this way, it is possible for the around view provision apparatus to provide an accurate around view image based on a calibrated image.

On the other hand, the processor 170 may apply the calculated first offset information offset1 to the second camera and the third camera adjacent to the first camera. For example, the processor 170 may control calibration for the rear view camera 195*b* and the front view camera 195*d* adjacent to the right side view camera 195*c* to be performed using the calculated first offset information offset1.

The processor 170 may partially apply the calculated first offset information offset1 to an image captured by the front view camera 195*d* or the rear view camera 195*b* to acquire a calibrated image. In addition, the processor 170 may generate an around view image based on images calibrated as described above. Here, the calculated first offset information may be applied with reference to a known relative positioning information of each of the cameras or the images captured by those cameras.

For example, the calculated offset information from one camera (e.g., the right side view camera 195*c*) may be used to calculate offset information for the remaining cameras (e.g., the rear view camera 195*b* and the front view camera 195*d*) without analyzing the images from the remaining cameras or by applying the calculated offset information to the other cameras. While each camera may be separately calibrated using respective reference images and captured images, this may cause delays in calibration. In certain situations, such as when only one camera is out of calibration, it may be desirable to perform calibration for only that camera. Hence, relative positioning information for the cameras or images captured from each of the cameras may be stored. When one of the cameras is calibrated using the stored reference image and captured image, the calculated offset information may be used to calibrate the remaining cameras using the stored relative positioning information rather than performing separate image based calibrations for each of the cameras or applying the same calculated offset information.

Figure 10:
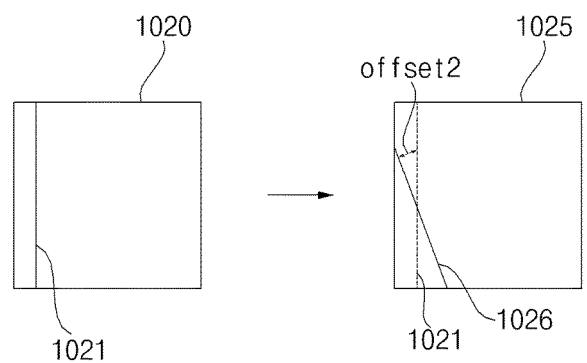

FIG. 10 shows, by way of example, that a character line of the vehicle may be contained in a reference image and a captured image. A reference image 1020 for the right side view camera 195c and an image 1025 captured by the right side view camera 195c may contain a character line of the vehicle. For example, the reference image 1020 and the captured image 1025 may contain the lower end of the right side body of the vehicle.

A character line 1021 of the vehicle may be a part of the reference image 1020 for the right side view camera 195c and a character line 1026 of the vehicle may be a part of the image 1025 captured by the right side view camera 195c. The character line 1026 of the vehicle in the captured image 1025 may tilt in a right diagonal direction corresponding to the shifted position of the camera 195c.

The processor 170 may calculate offset information offset2 based on a difference between the character line 1021 of the vehicle in the reference image 1020 and the character line 1026 of the vehicle in the captured image 1025. That is, the processor 170 may calculate an amount in which the right side view camera 195c in the right side rear direction has turned. The processor 170 may calibrate the captured image 1025 using the offset information offset2 such that the image is calibrated, for example, in the left side front direction.

Unlike FIG. 10, on the other hand, the reference image and the captured image may contain an object outside the vehicle and the processor 170 may calculate offset information based on a difference between the object contained in the reference image and the object contained in the captured image. The object outside the vehicle may include at least one selected from among a speed bump in the parking lot, a post, a traffic sign, a signal light, a streetlight, or another appropriate type of object suitable for use as a reference.

In a case in which the offset information is greater than or equal to a predetermined level, the processor 170 may control a notification message to be output indicating that it is not possible to generate an around view image. In particular, the notification message may be output through the display unit 180 or the audio unit 185.

Figure 11:
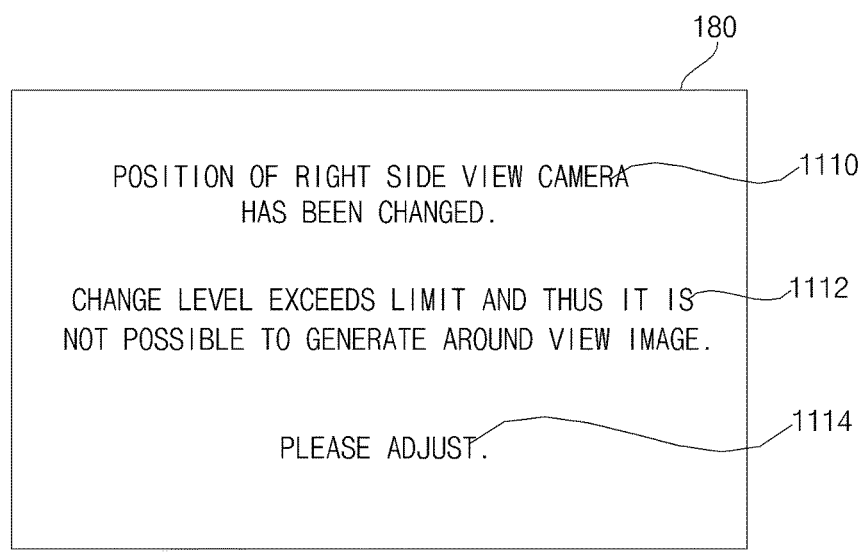

FIG. 11 shows, by way of example, a notification message 1112 indicating that it is not possible to generate an around view image displayed on the display unit 180. The processor 170 may control information 1110 regarding the camera, the position of which has been changed, and a caution message 1114 to be output in addition to the notification message 1112 indicating that it is not possible to generate the around view image.

Meanwhile, the processor 170 may calculate offset information at the time when the vehicle is started, at the time when the side view mirror is manipulated, or when an impact applied to the vehicle during travel is greater than or equal to a predetermined level.

Figure 12:
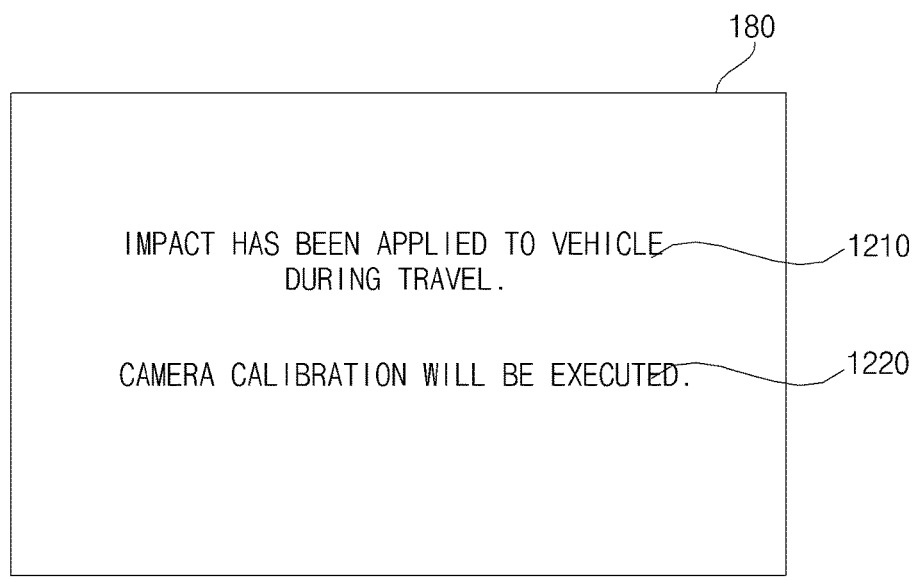

FIG. 12 shows, by way of example, a message 1220 displayed on the display unit 180 indicating that calibration will be executed based on offset information when an impact applied to the vehicle during travel of the vehicle is greater than or equal to a predetermined level.

On the other hand, the processor 170 may control a message 1210 to be output indicating that impact applied to the vehicle during travel of the vehicle is equal to or greater than a predetermined level. In addition, message 1210 may be output to the message 1220 indicating execution of calibration based on offset information.

Figure 13A:
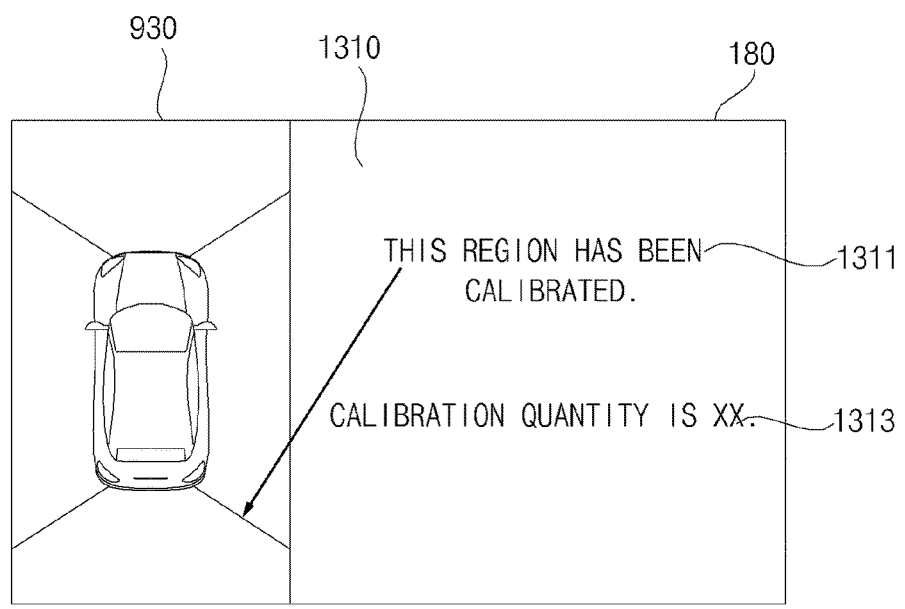

Meanwhile, the processor may control an around view image to be displayed on the display unit 180 and control a region calibrated by the offset information to be separately displayed or a calibration quantity to be displayed on the around view image. FIG. 13A shows, by way of example, that a calibrated around view image 930, information 1311 indicating a region calibrated by the offset information, and calibration quantity information 1313 are displayed on the display unit 180. Consequently, it is possible for a user to intuitively recognize which camera has been changed in position, whether the camera has been calibrated, and a quantity of calibration that was necessary for the camera.

Figure 13B:
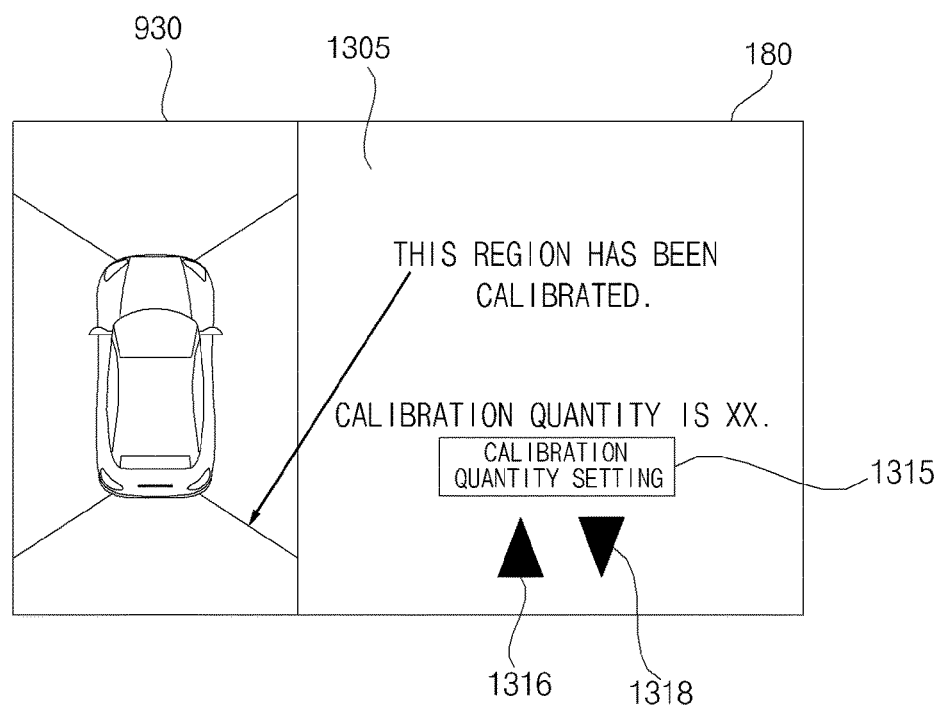

When generating the around view image, on the other hand, the processor 170 may change the calibration quantity according to a user input. FIG. 13B is similar to FIG. 13A but shows, by way of example, that a calibration quantity setting menu 1315 and calibration quantity setting items 1316 and 1318 may further be displayed on the display unit 180.

An around view image having an increased calibration quantity may be generated and output according to selection of the calibration quantity setting item 1316. On the other hand, an around view image having a decreased calibration quantity may be generated and output according to selection of the calibration quantity setting item 1318.

Figure 14:
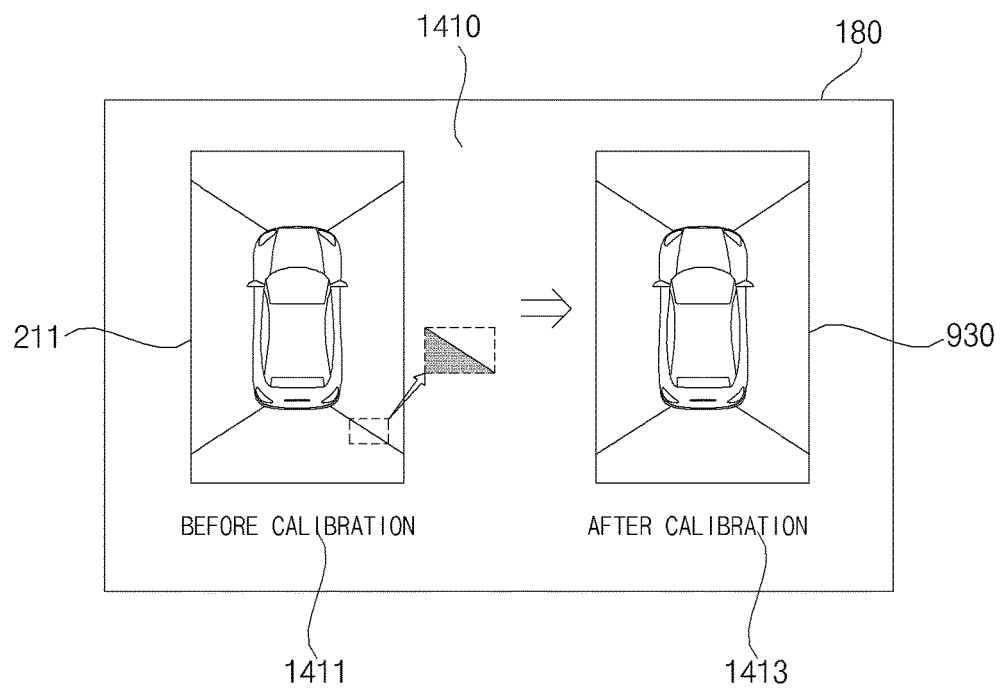

Meanwhile, the processor 170 may control an around view image generated using offset information and a second around view image generated without using the offset information to be simultaneously displayed on the display unit 180. FIG. 14 shows, by way of example, that a second around view image 211 generated without using offset information and an around view image 930 generated using the offset information may be simultaneously displayed on the display unit 180.

At this time, the processor 170 may control information 1411 indicating the second around view image 211 and information indicating the around view image 930 to be further displayed on the display unit 180. As a result, it is possible for a user to intuitively recognize generation of the around view image based on the offset information.

Meanwhile, in a case in which the around view image is selected from between the around view image and the second around view image displayed on the display unit 180, the processor 170 may continuously output the around view image. In addition, the processor 170 may generate an around view image based on captured images through continuous use of the generated offset information.

Particularly, in a case in which an impact applied to the vehicle is greater than or equal to a predetermined level, the processor 170 may continuously generate an around view image using the generated offset information. As a result, it is possible to continuously provide an accurate around view image to the user.

Figure 15:
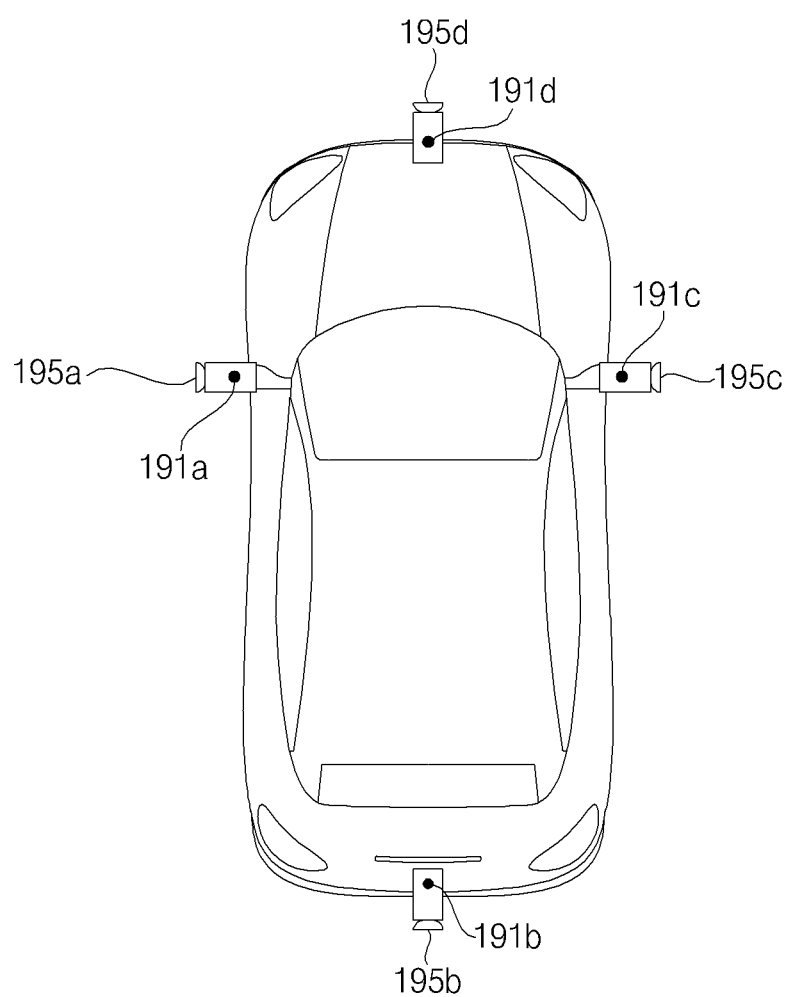
Figure 16A:
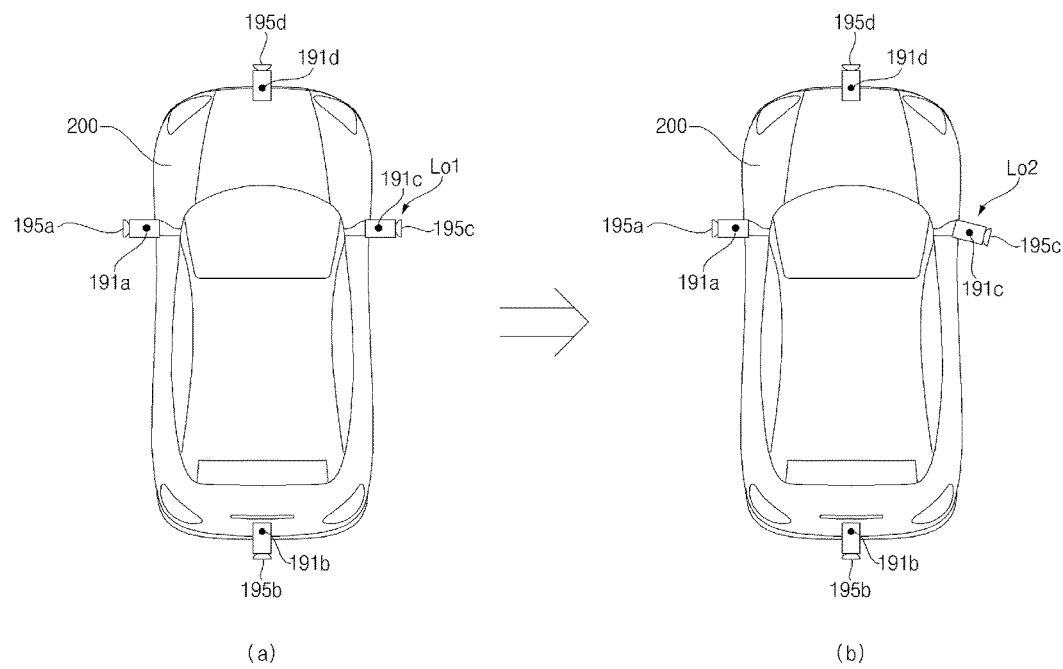

FIG. 15 shows, by way of example, that gyro sensors 191a, 191b, 191c, and 191d provided in the cameras 195a, 195b, 195c, and 195d, respectively. Referring to FIG. 16A, reference position information Lo1 may refer to a position of the right side view camera 195c that is normally positioned, and current position information Lo2 may refer to a position of the right side view camera 195c that is out of position and turned in the right side rear direction.

FIG. 16A(a) shows, by way of example, that the around view cameras 195a, 195b, 195c, and 195d include gyro sensors 191a, 191b, 191c, and 191d, respectively. In particular, FIG. 16A(a) shows, by way of example, that the right side view camera 195c is normally positioned. Consequently, the processor 170 may receive reference position information Lo1 for the right side view camera 195c and control the reference position information Lo1 to be stored in the memory 140.

FIG. 16A(b) shows, by way of example, that the right side view camera 195c of the around view cameras 195a, 195b, 195c, and 195d may be turned to a right side rear direction and, as a result, corresponding current position information Lo2 may be acquired. In comparison between FIGS. 16A(a) and 16A(b), it can be seen that the acquired position information Lo1 and the acquired position information Lo2 may be different from each other as the right side view camera 195c is turned to the right side rear direction.

Figure 16B:
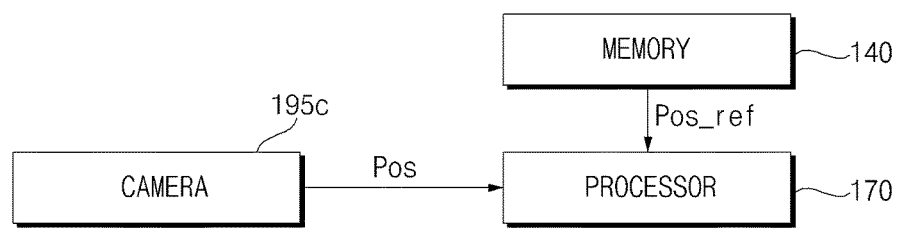

The processor 170 may calculate offset information using the difference between the position information Lo1 and the position information Lo2. For example, as illustrated in FIG. 16B, the processor 170 may receive reference position information Pos_ref for the right side view camera 195c from the memory and receive current position information Pos from the right side view camera 195c. The current position information Pos may be obtained using the gyro sensor 191c.

The processor 170 may calculate a difference between the reference position information Pos_ref and the current position information Pos and calculate offset information based on the difference therebetween. That is, since the right side view camera 195c is turned in the right side rear direction, the processor 170 may calculate offset information to partially calibrate the captured image in a left side front direction.

In addition, the processor 170 may calibrate the image captured by the right side view camera 195c using the calculated offset information. That is, the processor 170 may control the captured image to be calibrated in response to the reference position information.

Figure 16C:
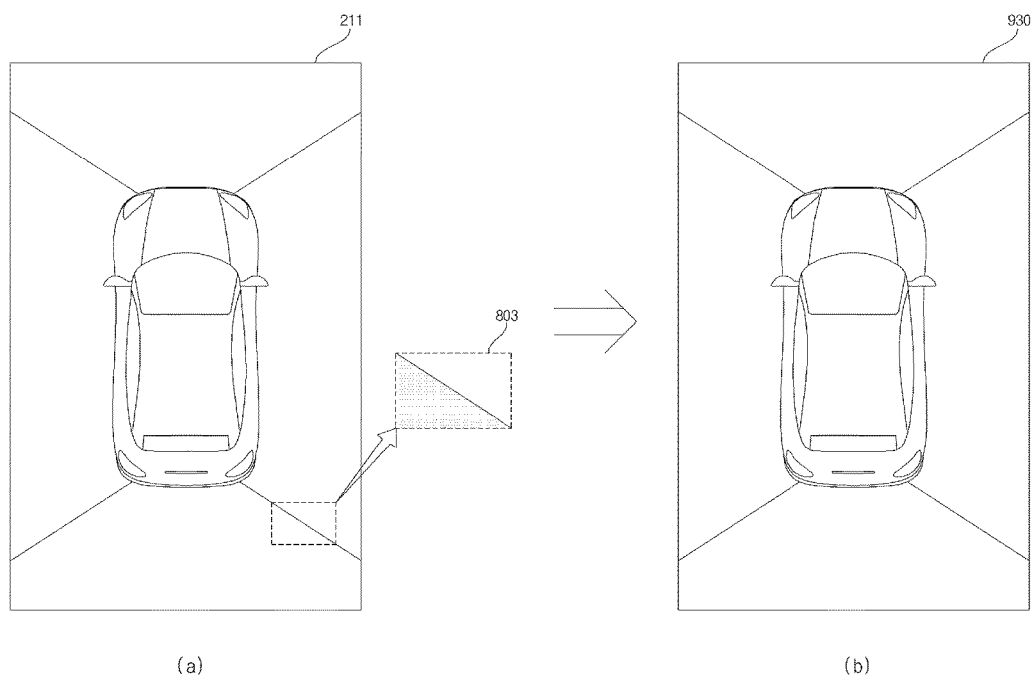

FIG. 16C(a) shows, by way of example, an around view image 211 that includes image tearing or edge increase at a boundary region 803 between an image captured by the rear view camera 195b and an image captured by the right side view camera 195c in an around view image 211.

FIG. 16C(b) shows, by way of example, an around view image 930 calibrated by the processor 170 based on the offset information. Here, image tearing may not be present at the boundary region 803 resulting in a more natural and accurate image. In this way, it is possible for the around view provision apparatus to provide an accurate around view image based on a calibrated image.

On the other hand, the processor 170 may apply the calculated offset information to other cameras, for example, to the second camera and the third camera which are adjacent to the first camera. That is, the processor 170 may control calibration for the rear view camera 195b and the front view camera 195d which are adjacent to the right side view camera 195c to be performed using the calculated offset information. In one embodiment, the processor 170 may calibrate the positions of all cameras based on a calibrated position of one of the cameras using known relative positional values for each of the cameras. This may allow faster calibration when all cameras are adjusted.

In an embodiment, the calibration using the stored reference images of FIGS. 7 to 14 and the calibration using gyro sensors of FIGS. 15 and 16 may be implemented together. For example, the processor 170 may compare a first offset information calculated using the stored reference images and a second offset information using the gyro sensors 191.

When the first and second offset information are within a prescribed range, the first offset information may be used to generate the around view image. However, when the first and second offset information are outside the prescribed range (or greater than a predetermined level), the second offset information may be used to generate the around view image. Here, when the offset is greater than a predetermined level, calibration using the reference image method may not be used accurately and a notification message may be displayed to the user indicating that calibration is not possible using this method, as previously described. Here, using the gyro sensors 191 to calibrate the camera may provide a greater amount of adjustment, suitable for offsets greater than the predetermined amount. Moreover, when the first and second offset information are outside the prescribed range, the processor 170 may control the first to fourth cameras 195a, 195b, 195c, and 195d to capture a new reference image using the second offset information of the gyro sensors 191a, 191b, 191c, and 191d.

Moreover, a method of calibrating the cameras may be selected based on the at least one characteristic of the first offset information or the second offset information, For example, one of the first offset information or the second offset information may be selected for generating the around view image based on respective speeds in which the first offset information using the reference image and the second offset information using the gyro sensor are generated. The selection may also be based on an availability of the first offset information and the second offset information. For example, if image based calibration was performed while the gyro based calibration has not yet been performed, the first offset information may be used to calibrate the cameras. Availability may also be based on a length of time since the last calibration using the respective methods.

Meanwhile, the various user interfaces (UI) shown in FIGS. 11 to 14 may also be applied to the method using the gyro sensors. As a result, user convenience may be improved.

Meanwhile, the operation method of the around view provision apparatus and the vehicle according to the present disclosure may be implemented as code that can be written on a processor-readable recording medium and thus read by a processor provided in the around view provision apparatus or the vehicle. The processor-readable recording medium may be any type of recording device in which data is stored in a processor-readable manner. The processor-readable recording medium may include, for example, a read only memory (ROM), a random access memory (RAM), a compact disc read only memory (CD-ROM), a magnetic tape, a floppy disc, and an optical data storage device and may be implemented in the form of a carrier wave transmitted over the Internet. The processor-readable recording medium can be distributed over a plurality of computer systems connected to a network such that processor-readable code is written thereto and executed therefrom in a decentralized manner.

As is apparent from the above description, an around view provision apparatus according to an embodiment of the present disclosure and a vehicle including the same each include first to fourth cameras mounted at a vehicle, a memory to store a reference image for each of the first to fourth cameras, and a processor to calculate offset information for at least one of the first to fourth cameras based on a difference between the reference image for each of the first to fourth cameras from the memory and an image photographed by each of the first to fourth cameras and to combine the respective images from the first to fourth cameras using the offset information so as to generate an around view image. Consequently, it is possible to provide an accurate around view image based on a calibrated image.

In particular, the processor may calculate offset information at the time of starting the vehicle, at the time of manipulating a side view mirror, or when impact applied to the vehicle during travel of the vehicle is equal to or greater than a predetermined level and generates an around view image based on the calculated offset information. Consequently, it is possible to provide an accurate around view image.

Meanwhile, the processor may control at least one selected from among a calibrated region, a calibration quantity, and the offset information to be changed according to a user input. Consequently, it is possible to improve user convenience.

On the other hand, an around view provision apparatus according to another embodiment of the present disclosure and a vehicle including the same may each include first to fourth cameras mounted at a vehicle, each of the first to fourth cameras including a gyro sensor, a memory to store reference position information for each of the first to fourth cameras, and a processor to calculate offset information based on the reference position information for each of the first to fourth cameras from the memory and current position information corresponding to a value sensed by the gyro sensor and to combine images from the first to fourth cameras using the offset information so as to generate an around view image. Consequently, it may be possible to provide an accurate around view image based on a calibrated image.

It is an object of the present disclosure to provide an around view provision apparatus that is capable of providing an accurate around view image based on a calibrated image and a vehicle including the same.

In accordance with an aspect of the present disclosure, the above and other objects may be accomplished by the provision of an around view provision apparatus including first to fourth cameras mounted at a vehicle, a memory to store a reference image for each of the first to fourth cameras, and a processor to calculate offset information for at least one of the first to fourth cameras based on a difference between the reference image for each of the first to fourth cameras from the memory and an image photographed by each of the first to fourth cameras and to combine the respective images from the first to fourth cameras using the offset information so as to generate an around view image.

In accordance with another aspect of the present disclosure, an around view provision apparatus may include first to fourth cameras mounted at a vehicle, each of the first to fourth cameras including a gyro sensor, a memory to store reference position information for each of the first to fourth cameras, and a processor to calculate offset information based on the reference position information for each of the first to fourth cameras from the memory and current position information corresponding to a value sensed by the gyro sensor and to combine images from the first to fourth cameras using the offset information so as to generate an around view image.

In accordance with another aspect of the present disclosure, a vehicle may include a steering drive unit to drive a steering apparatus, a brake drive unit to drive a brake apparatus, a power source drive unit to drive a power source, first to fourth cameras mounted at the vehicle, a memory to store a reference image for each of the first to fourth cameras, and a processor to calculate offset information for at least one of the first to fourth cameras based on a difference between the reference image for each of the first to fourth cameras from the memory and an image photographed by each of the first to fourth cameras and to combine the respective images from the first to fourth cameras using the offset information so as to generate an around view image.

In accordance with a further aspect of the present disclosure, a vehicle may include a steering drive unit to drive a steering apparatus, a brake drive unit to drive a brake apparatus, a power source drive unit to drive a power source, first to fourth cameras mounted at the vehicle, each of the first to fourth cameras including a gyro sensor, a memory to store reference position information for each of the first to fourth cameras, and a processor to calculate offset information based on the reference position information for each of the first to fourth cameras from the memory and current position information corresponding to a value sensed by the gyro sensor and to combine images from the first to fourth cameras using the offset information so as to generate an around view image.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An around view provision apparatus comprising:
   a first camera provided at a first side of a vehicle;
   a second camera provided at a second side of the vehicle;
   a third camera provided at a third side of the vehicle;
   a fourth camera provided at a fourth side of the vehicle, the first to fourth cameras provided to capture images of different regions;
   a memory to store a reference image for each of the first to fourth cameras;
   a processor to calculate offset information for at least one of the first to fourth cameras based on a difference between the reference image for the at least one of the first to fourth cameras from the memory and an image captured by the at least one of the first to fourth cameras, and to combine the respective images from the first to fourth cameras using the calculated offset information so as to generate an around view image; and
   a display unit to simultaneously display the around view image generated using the calculated offset information and a second around view image generated without using the calculated offset information,
   wherein, when the around view image is selected from between the around view image and the second around view image displayed on the display unit, the display unit displays the selected around view image through continuous use of the calculated offset information,
   wherein unless an impact applied to the vehicle is greater than or equal to a predetermined level, the processor continuously generates a third around view image through continuous use of the calculated offset information after displaying the selected around view image.

2. The around view provision apparatus according to claim 1, wherein the processor calculates the offset information based on a reference image for the first camera among the first to fourth cameras and an image captured by the first camera, and applies the calculated offset information to at least one of the second to fourth cameras.

3. The around view provision apparatus according to claim 1, wherein the processor applies the calculated offset information to the second camera and the third camera which are provided adjacent to the first camera.

4. The around view provision apparatus according to claim 1, wherein the reference image and the captured image each contain a line corresponding to a portion of the vehicle, and
the processor calculates the offset information based on a difference between relative positions of the line in the reference image and the line in the captured image.

5. The around view provision apparatus according to claim 1, wherein the reference image and the captured image each contain an object positioned near the vehicle, and
the processor calculates the offset information based on a difference between relative positions of the object in the reference image and the object in the captured image.

6. The around view provision apparatus according to claim 1, further comprising an output unit to output a notification message indicating that it is not possible to generate the around view image in a case in which the offset information is greater than or equal to a prescribed level.

7. The around view provision apparatus according to claim 1, wherein the processor calculates the offset information when the vehicle is started, when a side view mirror is manipulated, or when an impact applied to the vehicle during travel is greater than or equal to a prescribed level.

8. The around view provision apparatus according to claim 1, further comprising a display unit to display the around view image, wherein the processor controls a region calibrated by the offset information to be separately displayed or a quantity of calibration to be displayed on the around view image displayed on the display unit.

9. The around view provision apparatus according to claim 1:
wherein the display unit displays a region calibrated by the offset information on the around view image or displays a quantity of calibration on the around view image,
wherein the processor controls at least one selected from among the calibrated region, the calibration quantity, or the offset information to be changed according to an input at a user input device.

10. The around view provision apparatus according to claim 1, wherein each of the first to fourth cameras includes a gyro sensor that senses a position of each respective camera, and wherein the processor calculates a second offset information based on a reference position information for at least one of the first to fourth cameras from the memory and a corresponding sensed position.

11. The around view provision apparatus of claim 10, wherein the processor compares the first offset information and the second offset information, and
when the first and second offset information are within a prescribed level, using the first offset information to generate the around view image,
when the first and second offset information are outside the prescribed level, using the second offset information to generate the around view image, and
when the first and second offset information are outside the prescribed level, the processor controls the first to fourth cameras to capture a new reference image using the second offset information of the gyro sensor.

12. The around view provision apparatus of claim 10, wherein the around view image is generated using the first offset information or the second offset information selected based on at least one characteristic of the first and second offset information,
wherein one of the first offset information or the second offset information is selected to generate the around view image based on respective speeds in which the first offset information using the reference image and the second offset information using the gyro sensor are generated, or selected based on an availability of the first offset information or the second offset information.

13. A vehicle comprising:
a steering drive unit to drive a steering apparatus;
a brake drive unit to drive a brake apparatus;
a power source drive unit to drive a power source;
a plurality of cameras mounted on the vehicle to provide an around view image;
a memory to store a reference image for each of the plurality of cameras;
a processor to calculate offset information for a camera based on a difference between a reference image for the camera from the memory and an image captured by the camera and to combine a plurality of captured images from the plurality of cameras using the offset information so as to generate the around view image; and
a display unit to simultaneously display the around view image generated using the calculated offset information and a second around view image generated without using the calculated offset information,
wherein, when the around view image is selected from between the around view image and the second around view image displayed on the display unit, the display unit displays the selected around view image through continuous use of the calculated offset information,
wherein unless an impact applied to the vehicle is greater than or equal to a predetermined level, the processor continuously generates a third around view image through continuous use of the calculated offset information after displaying the selected around view image.

14. The vehicle according to claim 13, wherein the processor calculates the offset information when the vehicle is started, when a side view mirror is manipulated, or when an impact applied to the vehicle during travel is greater than or equal to a prescribed level.

15. The vehicle according to claim 13,
wherein the display unit displays a region calibrated by the offset information on the around view image or displays a quantity of calibration on the around view image,
wherein the processor controls at least one selected from among the calibrated region, the calibration quantity, or the offset information to be changed according to an input at a user input device.

16. The vehicle according to claim 13, wherein each of the plurality of cameras includes a gyro sensor that senses a position of each respective camera, and wherein the processor calculates a second offset information based on a reference position information for at least one of the plurality of cameras from the memory and a corresponding sensed position.

17. The vehicle according to claim 16, wherein the processor compares the first offset information and the second offset information, and
 when the first and second offset information are within a prescribed level, using the first offset information to generate the around view image,
 when the first and second offset information are outside the prescribed level, using the second offset information to generate the around view image, and
 when the first and second offset information are outside the prescribed level, the processor controls the plurality of cameras to capture a new reference image using the second offset information of the gyro sensor.

18. The vehicle according to claim 17, wherein the around view image is generated using the first offset information or the second offset information selected based on at least one characteristic of the first and second offset information,
 wherein one of the first offset information or the second offset information is selected to generate the around view image based on respective speeds in which the first offset information using the reference image and the second offset information using the gyro sensor are generated, or selected based on an availability of the first offset information or the second offset information.

* * * * *